US012764319B2

(12) United States Patent
Liu et al.

(10) Patent No.: US 12,764,319 B2
(45) Date of Patent: Oct. 13, 2026

(54) METHOD FOR LOCAL ILLUMINATION COMPENSATION

(71) Applicants: Beijing Bytedance Network Technology Co., Ltd, Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 19/002,259

(22) Filed: Dec. 26, 2024

(65) Prior Publication Data

US 2025/0126285 A1 Apr. 17, 2025

Related U.S. Application Data

(63) Continuation of application No. 17/380,354, filed on Jul. 20, 2021, now Pat. No. 12,212,769, which is a (Continued)

(30) Foreign Application Priority Data

Jan. 23, 2020 (WO) ................ PCT/CN2020/073973

(51) Int. Cl.

*H04N 19/46* (2014.01)
*H04N 19/105* (2014.01)

(Continued)

(52) U.S. Cl.

CPC .......... *H04N 19/46* (2014.11); *H04N 19/105* (2014.11); *H04N 19/124* (2014.11); *H04N 19/159* (2014.11); *H04N 19/176* (2014.11)

(58) Field of Classification Search

CPC .... H04N 19/46; H04N 19/105; H04N 19/124; H04N 19/159; H04N 19/176; H04N 19/463; H04N 19/52

See application file for complete search history.

(56) References Cited

U.S. PATENT DOCUMENTS 9,667,942 B2 5/2017 Chen
9,860,529 B2 1/2018 Zhang (Continued)

FOREIGN PATENT DOCUMENTS

BR 112021014711 A2 9/2021
CN 102215389 A 10/2011

(Continued)

OTHER PUBLICATIONS

Bross et al. "Versatile Video Coding {Draft 3)," Joint Video Experts Team (JVET) of ITU-T SG 16 WP 3 and ISO/IEC JTC 1/SC 29/WG 11 12th Meeting, Macao, CN, Oct. 3-12, 2018, document JVET-L1001, 2018.

(Continued)

*Primary Examiner* — Dramos Kalapodas
(74) *Attorney, Agent, or Firm* — Conley Rose, P.C.

(57) ABSTRACT

A method for processing a video includes determining, for a first video unit, a set of local illumination compensation (LIC) parameters including a scaling factor and an offset factor; performing or skipping a pre-process on at least one parameter of the set of LIC parameters; and updating at least one history based local illumination compensation parameter table (HLICT) using at least one parameter of the set of (Continued)

LIC parameters, the at least one HLICT being used for a conversion of subsequent video units.

20 Claims, 23 Drawing Sheets

Related U.S. Application Data continuation of application No. PCT/CN2020/073973, filed on Jan. 23, 2020.

(51) Int. Cl.

| | |
|---|---|
| ***H04N 19/124*** | (2014.01) |
| ***H04N 19/159*** | (2014.01) |
| ***H04N 19/176*** | (2014.01) |

(56) References Cited

U.S. PATENT DOCUMENTS

| | | | | |
|---|---|---|---|---|
| 10,110,922 | B2 | 10/2018 | Zhang | |
| 10,349,083 | B2 | 7/2019 | Chen | |
| 10,542,280 | B2 | 1/2020 | Sun | |
| 10,587,934 | B2 | 3/2020 | Wang | |
| 10,652,571 | B2 | 5/2020 | Hu | |
| 10,715,810 | B2 | 7/2020 | Zhang | |
| 10,798,404 | B2 | 10/2020 | Chuang | |
| 10,880,570 | B2 * | 12/2020 | Chuang | H04N 19/44 |
| 10,951,912 | B2 * | 3/2021 | Chuang | H04N 19/186 |
| 2016/0366415 | A1 | 12/2016 | Liu | |
| 2017/0034513 | A1 | 2/2017 | Leontaris | |
| 2017/0150156 | A1 * | 5/2017 | Zhang | H04N 19/186 |
| 2017/0150176 | A1 * | 5/2017 | Zhang | H04N 19/122 |
| 2017/0150186 | A1 | 5/2017 | Zhang | |
| 2018/0063531 | A1 | 3/2018 | Hu | |
| 2018/0098079 | A1 | 4/2018 | Chuang | |
| 2018/0184117 | A1 | 6/2018 | Chen | |
| 2018/0332298 | A1 * | 11/2018 | Liu | H04N 19/70 |
| 2018/0359483 | A1 | 12/2018 | Chen | |
| 2019/0124350 | A1 * | 4/2019 | Thirumalai | H04N 19/52 |
| 2019/0215522 | A1 | 7/2019 | Zhang | |
| 2020/0336738 | A1 | 10/2020 | Xiu | |
| 2020/0344482 | A1 | 10/2020 | Zhang | |
| 2021/0076029 | A1 | 3/2021 | Han | |
| 2022/0124343 | A1 | 4/2022 | Filippov | |
| 2022/0329793 | A1 * | 10/2022 | Lim | H04N 19/117 |
| 2022/0360811 | A1 * | 11/2022 | Li | H04N 19/513 |

FOREIGN PATENT DOCUMENTS

| | | | |
|---|---|---|---|
| CN | 105379288 | A | 3/2016 |
| CN | 107147911 | A | 9/2017 |
| CN | 108293137 | A | 7/2018 |
| CN | 113302916 | B | 4/2024 |
| WO | 2018056763 | A1 | 3/2018 |
| WO | 2018067729 | A1 | 4/2018 |
| WO | 2018128222 | A1 | 7/2018 |
| WO | 2018205954 | A1 | 11/2018 |
| WO | 2019006363 | A1 | 1/2019 |

OTHER PUBLICATIONS https://vcgit.hhi.fraunhofer.de/jvet/VVCSoftware_VTM/tags/VTM-3.1, Oct. 1, 2021.

"Information Technology—High Efficiency Coding and Media Delivery in Heterogeneous Environments—Part 2: High Efficiency Video Coding" Apr. 20, 2018, ISO/DIS 23008, 4th Edition.

Rosewarne et al. "High Efficiency Video Coding (HEVC) Test Model 16 (HM 16) Improved Encoder Description Update 7," Joint Collaborative Team on Video Coding (JCT-VG) ITU-T SG 16 WP3 and ISO/IEC JTC1/SC29/WG11, 25th Meeting, Chengdu, CN, Oct. 14-21, 2016, document JCTVC-Y1002, 2016.

Chen et al. "Algorithm Description of Joint Exploration Test Model 7 {JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

JEM-7.0: https://jvet.hhi.fraunhofer.de/svn/svn_HMJEMSoftware/tags/ HM-16.6-JEM-7.0, Oct. 1, 2021.

Hsiao et al. "CE4.4.12: Pairwise Average Candidates," Joint Video Experts Team {JVET) of ITU-T SG 16 WP 3 and SO/IEC JTC 1/SC 29/WG 11, 12th Meeting, Macao, CN, Oct. 3-12, 2018, document JVET-L0090, 2019.

Su et al. "CE4.4.1: Generalized Bi-Prediction for Intercoding," Joint Video Exploration Team of ISO/IEC JTC 1/SC 29/ WG 11 and ITU-T SG 16, Ljubljana, Jul. 10-18, 2018, document No. JVET-K0248, 2018.

Jeong et al. "CE4 Ulitmate Motion Vector Expression {Test 4.5.4)," Joint Video Experts Team {JVET) of ITU-T SG 16 WP 3 and ISO/IEC JTC 1/SC 29/WG 11, 12th Meeting, Macao, CN, Oct. 3-12, 2018, document JVET-L0054, 2018.

Chen et al. "CE4: Symmetrical MVD Mode (Test 4.4.3)," Joint Video Experts Team {JVET) of ITU-T SG 16 WP 3 and ISO/IEC JTC 1/SC 29/WG 11, 13th Meeting, Marrakech, MA Jan. 9-18, 2019, document JVET-M0481, 2019.

Tamse et al. "CE4.7.1 and CE4.7.2—Non Temporal Illumination Compensation in JVET-K1024," Joint Video Experts Team (JVET) of ITU-T SG 16 WP 3 and ISO/IEC JTC 1/SC 29/WG 11 12th Meeting, Macao, CN, Oct. 3-12, 2018. document JVET-K0056, 2018.

Zhang et al. "CE4: History-based Motion Vector Prediction (Test 4.4.7)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0266, 2018.

Su et al. "CE4-Related: Generalized Bi-Prediction Improvements Combined from JVET-L0197 and JVET-L0296," Join Video Experts Team {JVET) of ITU-T SG 16 WP 3 and ISO/IEC JTC 1/SC 29/WG 11, 12th Meeting, Macao, CN, Oct. 3-12, 2018, document JVET-L0646, 2018.

Li et al. "CE4-Related: Constraint on Gbi Index Inheritance in Merge Mode," Joint Video Experts Team {JVET) of ITU—SG 16 WP 3 and ISO/IEC JTC 1/SC 29/WG 11, 13th Meeting, Marrakech, MA, Jan. 9-18, 2019, document JVET-M0433, 2019.

JVET-M0450-v2, Xu et al. "CE10-related: LIC Inheritance Restrictions and Interaction with GBI," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0450, 2019.

Intemational Search Report and Written Opinion from International Patent Application No. PCT /CN2020/073973 dated Apr. 21, 2020 (10 pages).

Intemational Search Report and Written Opinion from International Patent Application No. PCT/CN2020/073975 dated Apr. 21, 2020 (10 pages).

CNPATENT (Chinese application No. 202080009203.0; Our Ref.: C19W5791.01CN; Mailing Date: Apr. 12, 2024).

Non-Final Office Action from U.S. Appl. No. 17/380,354 dated Mar. 20, 2024, 33 pages.

Notice of Allowance from U.S. Appl. No. 17/380,354 dated Sep. 20, 2024, 10 pages.

* cited by examiner (a) Second PU of N x 2N (b) Second PU of 2N x N

Original merge candidate list

| Merge_idx | L0 | L1 |
|---|---|---|
| 0 | mvL0_A, ref0 | |
| 1 | | mvL1_B, ref0 |
| 2 | | |
| 3 | | |
| 4 | | |

Merge candidate list after adding combined candidates

| Merge_idx | L0 | L1 |
|---|---|---|
| 0 | mvL0_A, ref0 | combine |
| 1 | | mvL1_B, ref0 |
| 2 | mvL0_A, ref0 | mvL1_B, ref0 |
| 3 | | |
| 4 | | |

combine

FIG. 7

METHOD FOR LOCAL ILLUMINATION COMPENSATION

CROSS REFERENCE TO RELATED APPLICATIONS

This application is a continuation of U.S. application Ser. No. 17/380,354, filed on Jul. 20, 2021, which is a continuation of International Application No. PCT/CN2020/073973, filed on Jan. 23, 2020, which claims the priority to and benefits of International Patent Application No. PCT/CN2019/073296, filed on Jan. 27, 2019. For all purposes under the law, the entire disclosure of the aforementioned applications is incorporated by reference as part of the disclosure of this application.

TECHNICAL FIELD

This disclosure is related to video and image coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments.

In one example aspect, a method of processing video is disclosed. The method includes determining, for a first video unit, a set of local illumination compensation (LIC) parameters including a scaling factor and an offset factor; performing or skipping a pre-process on at least partial of the set of LIC parameters; and updating at least one history based local illumination compensation parameter table (HLICT) using at least partial of the set of LIC parameters, wherein the at least one HLICT is used for a conversion of subsequent video units.

In another example aspect, a method for processing video is disclosed. The method includes: determining, for a first video unit, a set of local illumination compensation (LIC) parameters including a scaling factor and an offset factor; and updating, based on the set of LIC parameters, at least one history based local illumination compensation parameter table (HLICT) in a first-in first-out (FIFO) order.

In another example aspect, a method for processing video is disclosed. The method comprises maintaining at least one history based local illumination compensation parameter table (HLICT) including one or more sets of LIC parameters; and determining, based on at least one indication, at least one set of LIC parameters from the at least one HLICT, performing, illumination compensation process for a first video unit, based on the at least one set of LIC parameters, wherein the first video unit is coded with an advanced motion vector prediction (AMVP) mode.

In another example aspect, a method for processing video is disclosed. The method includes deriving a set of local illumination compensation (LIC) parameters associated with at least one first video block located at a first position; updating a history local illumination compensation parameter table (HLICT) with the derived set of LIC parameters; and processing at least one second video block located at a second position based on the HLICT.

In yet another example aspect, a method for processing video is disclosed. The method includes deriving, for a first video unit, a set of local illumination compensation (LIC) parameters from neighboring samples of a first video unit and corresponding reference samples; updating a history local illumination compensation parameter table (HLICT) with the derived set of LIC parameters; and processing a second video unit based on the HLICT.

In still another example aspect, a method for processing video is disclosed. The method includes deriving local illumination compensation (LIC) parameters from samples associated with a video block; updating one or more history LIC parameter tables (HLICT) with the derived LIC parameters; and perform video processing on at least one subsequent video unit based on the updated one or more HLICT tables.

In yet another example aspect, a method for processing video is disclosed. The method includes storing, for a video block, local illumination compensation (LIC) information together with motion information, as an entry, in a history based motion vector prediction (HMVP) table, wherein the LIC information is associated with the motion information; and performing a conversion on the video block based on the HMVP table.

In another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present disclosure.

BRIEF DESCRIPTION OF THE DRAWINGS

FIG. 7 shows an example of a combined bi-predictive merge candidate.

DETAILED DESCRIPTION

The present disclosure provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present disclosure for ease of understanding and do not limit the embodiments and techniques to the corresponding sections. As such, embodiments from one section can be combined with embodiments from other sections.

1. SUMMARY

This disclosure is related to video coding technologies. Specifically, it is related to local illumination compensation (LIC) and generalized bi-prediction (GBI) in video coding. It may be applied to the existing video coding standard like HEVC, or the standard Versatile Video Coding (VVC) to be finalized. It may be also applicable to future video coding standards or video codec.

2. BACKGROUND

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC joint technical committee (JTC1) subcommittee (SC) 29/working group (WG)11 (MPEG) was created to work on the VVC standard targeting at 50% bitrate reduction compared to HEVC.

Figure 20:
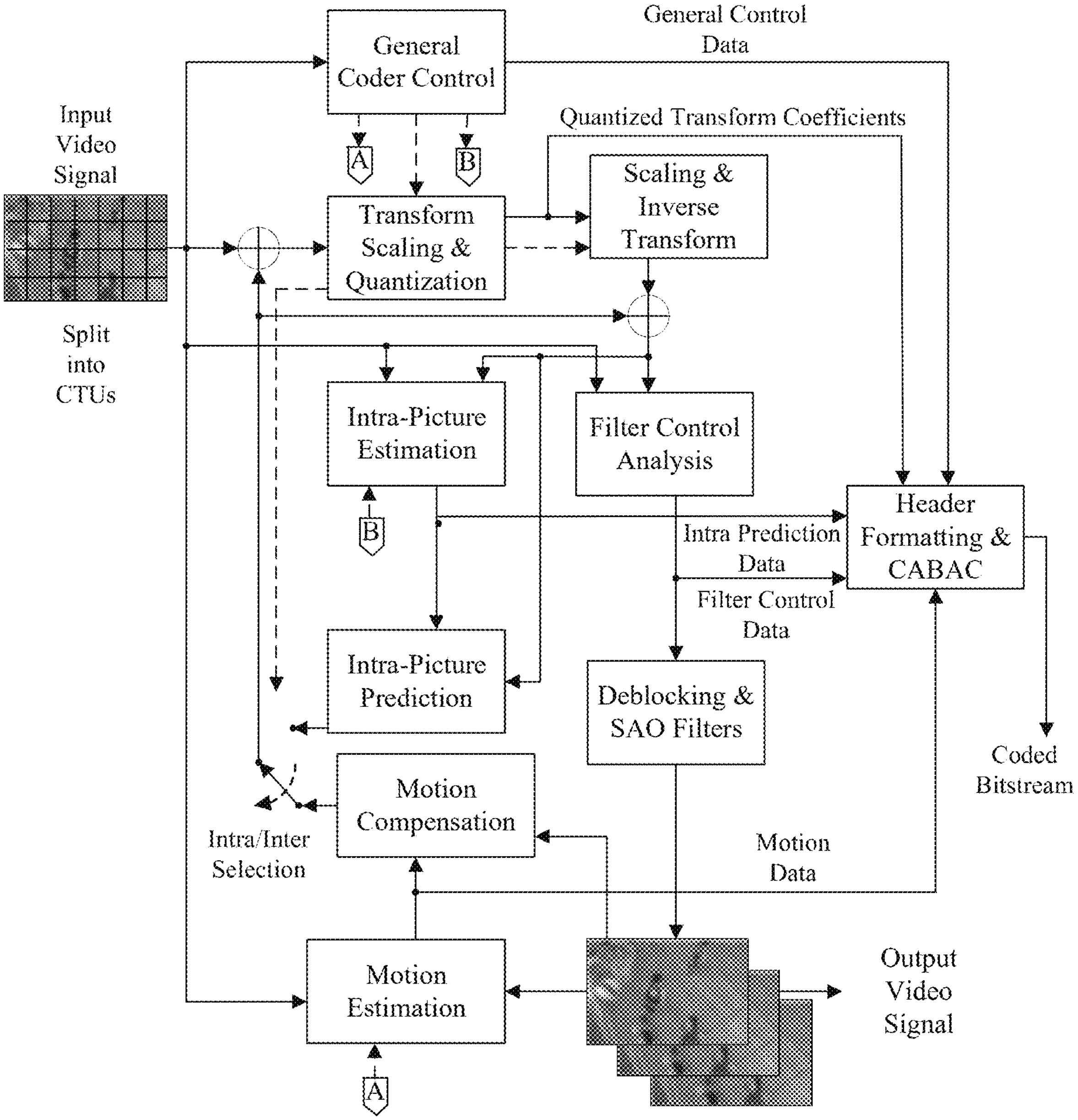
FIG. 20 shows a block diagram of an example implementation of a video encoder.

FIG. 20 is a block diagram of an example implementation of a video encoder. FIG. 20 shows that the encoder implementation has a feedback path built in in which the video encoder also performs video decoding functionality (reconstructing compressed representation of video data for use in encoding of next video data).

2.1 Inter prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Merge Mode

2.1.1.1 Derivation of Candidates for Merge Mode

Figure 1:
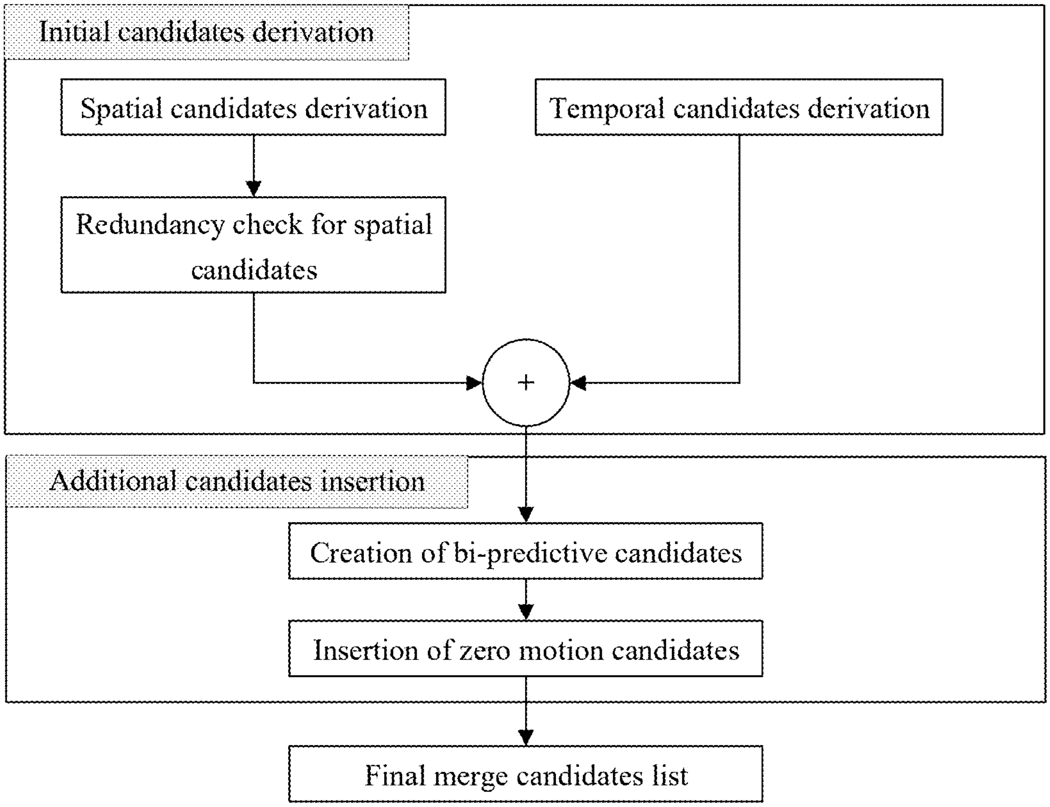
FIG. 1 shows an example of a derivation process for merge candidates list construction.

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.1.2 Spatial Candidates Derivation

Figure 2:
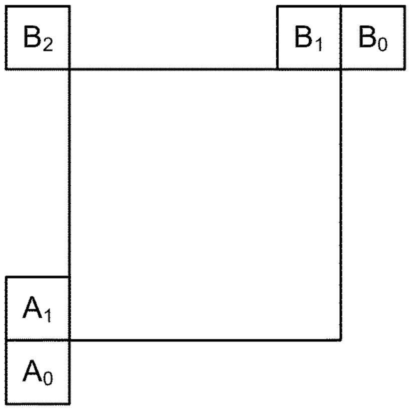
FIG. 2 shows an example of positions of spatial merge candidates.
Figure 3:
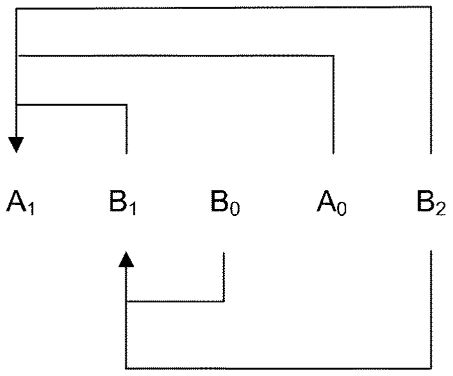
FIG. 3 shows an example of candidate pairs considered for redundancy check of spatial merge candidates.
Figure 4:
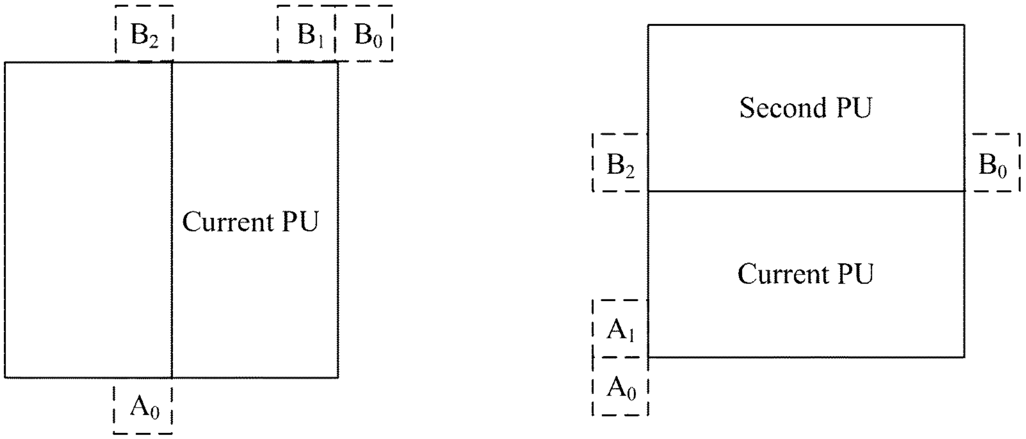
FIG. 4 shows an example of positions for the second prediction unit (PU) of N×2N and 2N×N partitions.

In the derivation of spatial merge candidates, a maximum of four merge candidates are selected among candidates located in the positions depicted in FIG. 2. The order of derivation is A1, B1, B0, A0 and B2. Position B2 is considered only when any PU of position A1, B1, B0, A0 is not available (e.g., because it belongs to another slice or tile) or is intra coded. After candidate at position A1 is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position A1 is not considered for list construction. In fact, by adding this candidate will lead to two prediction units having the same motion information, which is redundant to just have one PU in a coding unit. Similarly, position B1 is not considered when the current PU is partitioned as 2N×N.

2.1.1.3 Temporal Candidates Derivation

Figure 5:
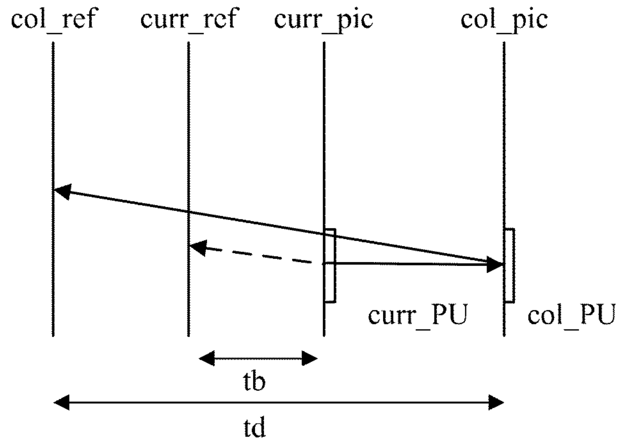
FIG. 5 shows an example of motion vector scaling for a temporal merge candidate.

In this step, only one candidate is added to the list. Particularly, in the derivation of this temporal merge candidate, a scaled motion vector is derived based on co-located PU belonging to the picture which has the smallest picture order count (POC) difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
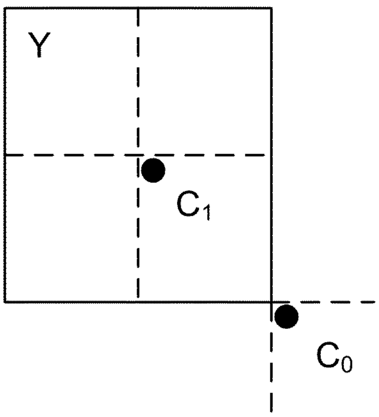
FIG. 6 shows an example of candidate positions for temporal merge candidate, C0 and C1.

In the co-located PU (Y) belonging to the reference frame, the position for the temporal candidate is selected between candidates C0 and C1, as depicted in FIG. 6. If PU at position C0 is not available, is intra coded, or is outside of the current coding tree unit (CTU) row, position C1 is used. Otherwise, position C0 is used in the derivation of the temporal merge candidate.

2.1.1.4 Additional Candidates Insertion

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.1.5 Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log2_parallel_merge_level_minus2" syntax element. When a MER is defined, merge candidates falling in the same region are marked as unavailable and therefore not considered in the list construction.

2.1.2 AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.2.1 Derivation of AMVP Candidates

Figure 8:
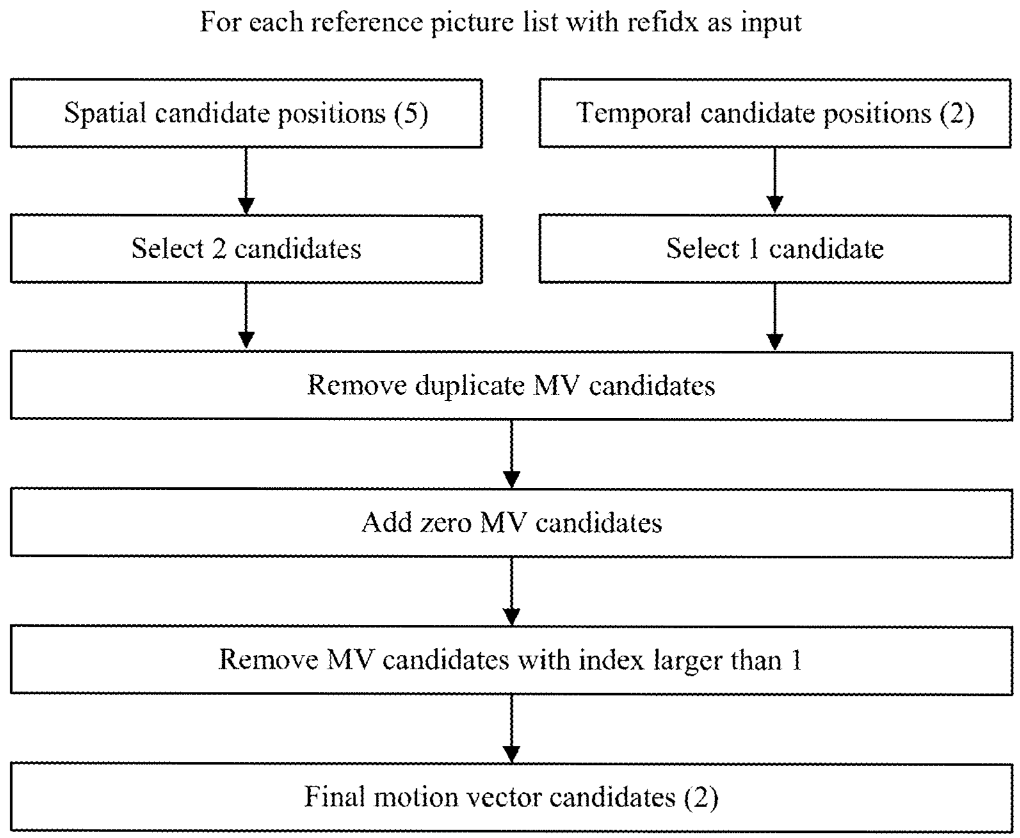
FIG. 8 shows an example of a derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.2.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as A0, A1, and scaled A0, scaled A1. The order of derivation for the above side of the current PU is defined as B0, B1, B2, scaled B0, scaled B1, scaled B2. For each side there are therefore four cases that can be used as motion vector candidate, with two cases not required to use spatial scaling, and two cases where spatial scaling is used. The four different cases are summarized as follows.

No Spatial Scaling (1) Same reference picture list, and same reference picture index (same POC)

(2) Different reference picture list, but same reference picture (same POC)

Spatial Scaling (3) Same reference picture list, but different reference picture (different POC)

(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above motion vector (MV) candidates. Otherwise, spatial scaling is not allowed for the above motion vector.

Figure 9:
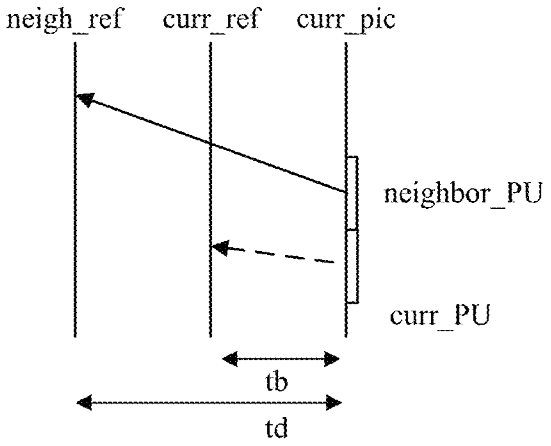
FIG. 9 shows an example of motion vector scaling for a spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.2.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 New Inter Prediction Methods 2.2.1 Sub-CU Based Motion Vector Prediction

In the JEM with quad tree binary tree (QTBT), each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.2.1.1 Alternative Temporal Motion Vector Prediction

Figure 10:
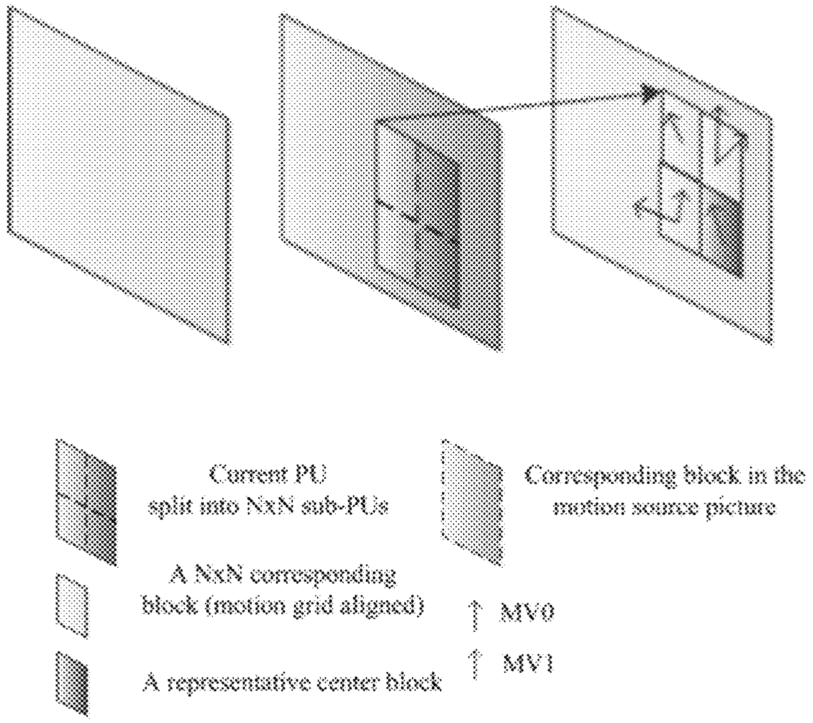
FIG. 10 shows an example of advanced temporal motion vector prediction (ATMVP) motion prediction for a coding unit (CU).

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 10, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 10.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with temporal motion vector prediction (TMVP), wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e., the POCs of all reference pictures of the current picture are smaller than the POC of the current picture) is fulfilled and possibly uses motion vector MVx (the motion vector corresponding to reference picture list X) to predict motion vector MVy (with X being equal to 0 or 1 and Y being equal to 1−X) for each sub-CU.

2.2.2 Pairwise Average Candidates

Pairwise average candidates are generated by averaging predefined pairs of candidates in the current merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. The pairwise average candidates replace the combined candidates in HEVC standard.

The complexity analysis of pairwise average candidates is summarized in the Table 1. For the worst case of additional calculations for averaging (the last column in Table 1), 4 additions and 4 shifts are needed for each pair (MVx and MVy in L0 and L1), and 4 reference index comparisons are needed for each pair (refIdx0 is valid and refIdx1 is valid in L0 and L1). There are 6 pairs, leading to 24 additions, 24 shifts, and 24 reference index comparisons in total. The combined candidates in HEVC standard use 2 reference index comparisons for each pair (refIdx0 is valid in L0 and refIdx1 is valid in L1), and there are 12 pairs, leading to 24 reference index comparisons in total.

TABLE 1

Operation analysis for the pairwise average candidates

| Merge list size | Max number of potential candidates | Max number of candidate comparisons | Max number of MV scalings | Max number of temporal candidates | Additional local buffer | Max number of memory access | Others |
|---|---|---|---|---|---|---|---|
| 6, 8, 10 | 6 | 0 | 0 | 0 | 0 | 0 | Replace HEVC combined candidates, need additional calculations for averaging |

2.2.3 Local Illumination Compensation

Local Illumination Compensation (LIC) is based on a linear model for illumination changes, using a scaling factor a and an offset b. And it is enabled or disabled adaptively for each inter-mode coded coding unit (CU).

Figure 11:
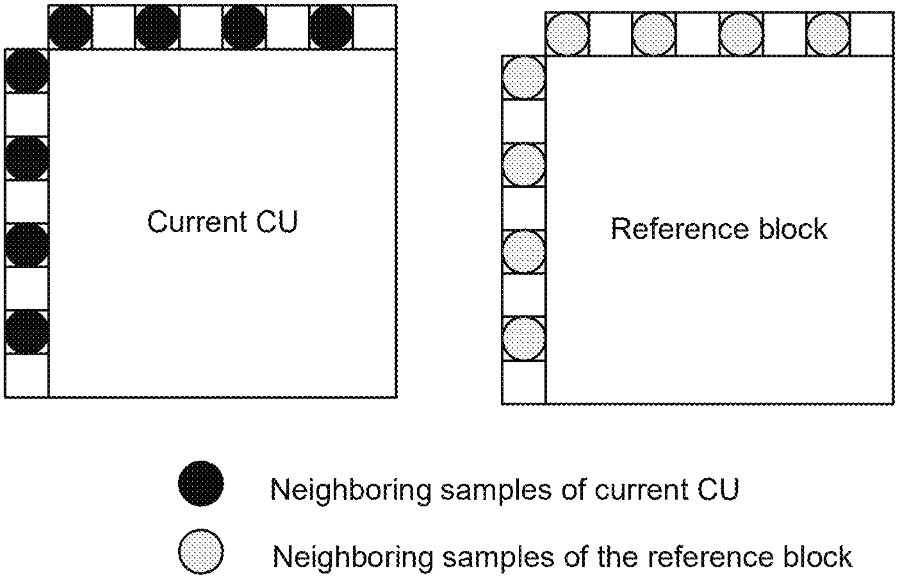
FIG. 11 shows an example of neighbouring samples used for deriving illumination compensation (IC) parameters.
Figure 12:
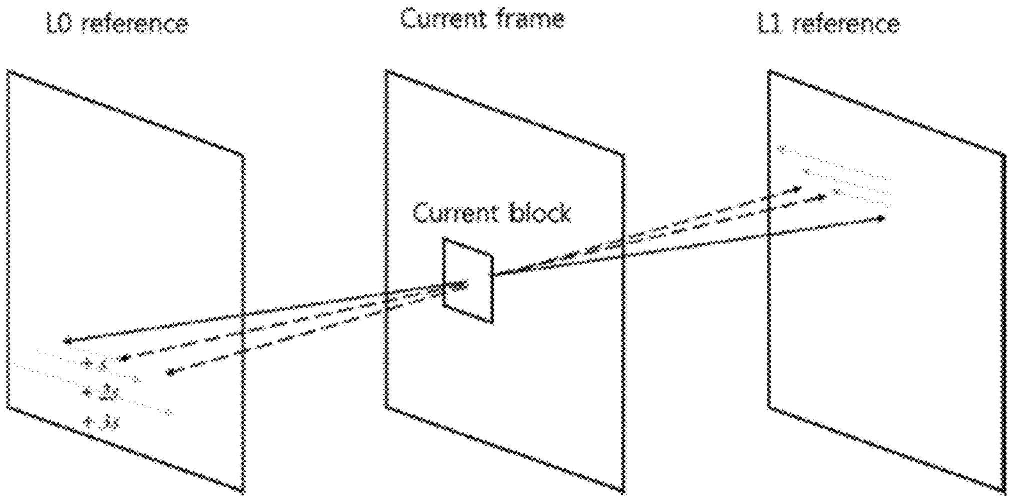
FIG. 12 shows an example of an ultimate motion vector expression (UMVE) Search Process.
Figure 13:
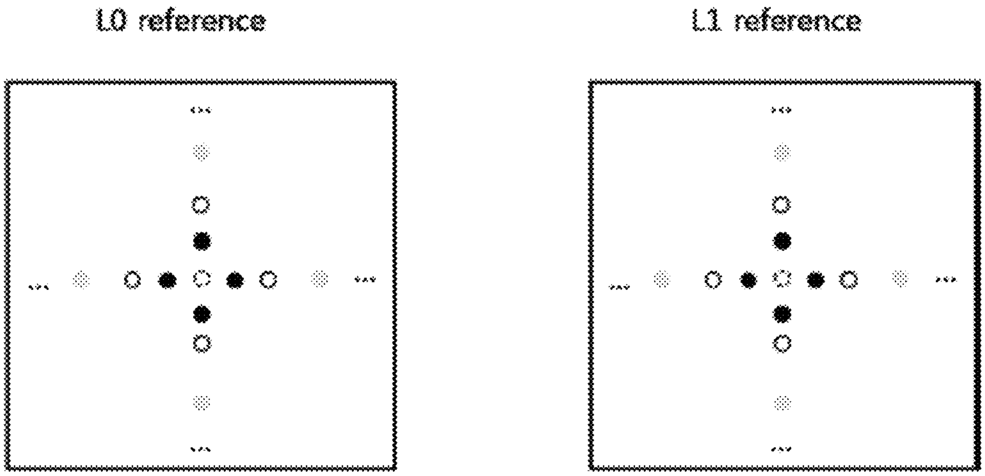
FIG. 13 shows an example of a UMVE Search Point.

When LIC applies for a CU, a least square error method is employed to derive the parameters a and b by using the neighbouring samples of the current CU and their corresponding reference samples. More specifically, as illustrated in FIG. 11, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level rate distortion (RD) check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.2.4 Generalized Bi-Prediction

In conventional bi-prediction, the predictors from L0 and L1 are averaged to generate the final predictor using the equal weight 0.5. The predictor generation formula is shown as in Equ. (1)

$$P_{TraditionalBiPred} = (P_{L0} + P_{L1} + RoundingOffset) \gg shiftNum, \quad (1)$$

In Equ. (1), $P_{TraditionalBiPred}$ is the final predictor for the conventional bi-prediction, $P_{L0}$ and $P_{L1}$ are predictors from L0 and L1, respectively, and RoundingOffset and shiftNum are used to normalize the final predictor.

Generalized Bi-prediction (GBI) is proposed to allow applying different weights to predictors from L0 and L1. The predictor generation is shown in Equ. (2).

$$P_{GBi} = ((1 - w_1) * P_{L0} + w_1 * P_{L1} + RoundingOffset_{GBi}) \gg shiftNum_{GBi}, \quad (2)$$

In Equ. (2), $P_{GBi}$ is the final predictor of GBi. $(1-w_1)$ and $w_1$ are the selected GBI weights applied to the predictors of L0 and L1, respectively. RoundingOffsetGBi and shiftNumGBi are used to normalize the final predictor in GBi.

The supported $w_1$ weight table is $\{-1/4, 3/8, 1/2, 5/8, 5/4\}$. One equal-weight set and four unequal-weight sets are supported. For the equal-weight case, the process to generate the final predictor is exactly the same as that in the conventional bi-prediction mode. For the true bi-prediction cases in random access (RA) condition, the number of candidate weight sets is reduced to three.

For advanced motion vector prediction (AMVP) mode, the weight selection in GBI is explicitly signaled at CU-level if this CU is coded by bi-prediction. For merge mode, the weight selection is inherited from the merge candidate. In this proposal, GBI supports decoder-side motion vector refinement (DMVR) to generate the weighted average of template as well as the final predictor for BMS-1.0.

2.2.5 Ultimate Motion Vector Expression

Ultimate motion vector expression (UMVE) is presented. UMVE is used for either skip or merge modes with a proposed motion vector expression method.

UMVE re-uses merge candidate as same as using in VVC. Among the merge candidates, a candidate can be selected, and is further expanded by the proposed motion vector expression method.

UMVE provides a new motion vector expression with simplified signaling. The expression method includes starting point, motion magnitude, and motion direction.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2

| Distance IDX | | | | | | | | |
|---|---|---|---|---|---|---|---|---|
| | Distance IDX | | | | | | | |
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the motion vector difference (MVD) relative to the starting point. The direction index can represent of the four directions as shown below.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag and merge flag. If skip and merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VVC test model (VTM)'s skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

2.2.6 History Based Motion Vector Prediction

In our previous invention P1805028401H, one or more look up tables with at least one motion candidate stored to predict motion information of a block.

Figure 14:
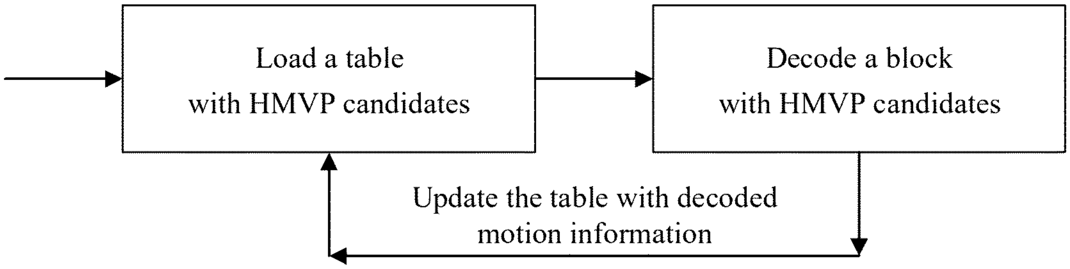
FIG. 14 shows an example of a decoding flow chart with an history-based motion vector prediction (HMVP) method.

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded block, the associated motion information is added to the last entry of the table as a new HMVP candidate. The overall coding flow is depicted in FIG. 14.

In one example, the table size is set to be L (e.g., L=16 or 6, or 44), which indicates up to L HMVP candidates may be added to the table.

Figure 15:
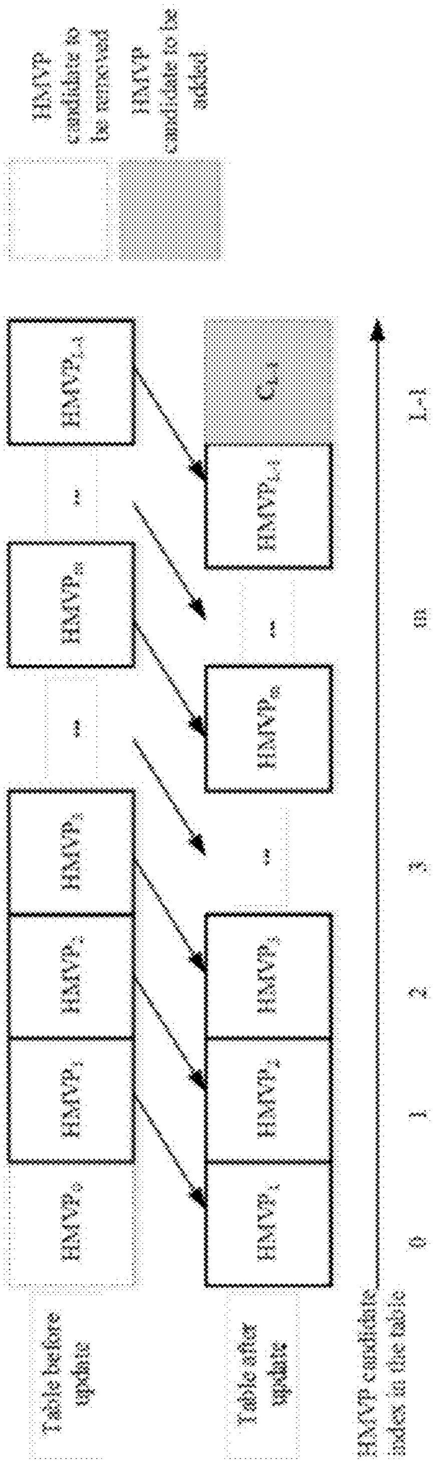
FIG. 15 shows an example of updating the table in the HMVP method.

In one embodiment, if there are more than L HMVP candidates from the previously coded blocks, a First-In-First-Out (FIFO) rule is applied so that the table always contains the latest previously coded L motion candidates. FIG. 15 depicts an example wherein the FIFO rule is applied to remove a HMVP candidate and add a new one to the table used in the proposed method.

In another embodiment, whenever adding a new motion candidate (such as the current block is inter-coded and non-affine mode), a redundancy checking process is applied firstly to identify whether there are identical or similar motion candidates in LUTs.

2.2.7 Symmetric Motion Vector Difference

Symmetric motion vector difference (SMVD) is proposed to encode the MVD more efficiently.

Firstly, in slice level, variables BiDirPredFlag, RefIdxSymL0 and RefIdxSymL1 are derived as follows:

The forward reference picture in reference picture list 0 which is nearest to the current picture is searched. If found, RefIdxSymL0 is set equal to the reference index of the forward picture.

The backward reference picture in reference picture list 1 which is nearest to the current picture is searched. If found, RefIdxSymL1 is set equal to the reference index of the backward picture.

If both forward and backward picture are found, BiDirPredFlag is set equal to 1.

Otherwise, following applies:

The backward reference picture in reference picture list 0 which is nearest to the current one is searched. If found, RefIdxSymL0 is set equal to the reference index of the backward picture.

The forward reference picture in reference picture list 1 which is nearest to the current one is searched. If found, RefIdxSymL1 is set equal to the reference index of the forward picture.

If both backward and forward picture are found, BiDirPredFlag is set equal to 1. Otherwise, BiDirPredFlag is set equal to 0.

Secondly, in CU level, a symmetrical mode flag indicating whether symmetrical mode is used or not is explicitly signaled if the prediction direction for the CU is bi-prediction and BiDirPredFlag is equal to 1.

When the flag is true, only mvp_l0_flag, mvp_l1_flag and MVD0 are explicitly signaled. The reference indices are set equal to RefIdxSymL0, RefIdxSymL1 for list 0 and list 1, respectively. MVD1 is just set equal to −MVD0. The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases}$$

The modifications in coding unit syntax are shown in Table 2.

TABLE 2

Modifications in coding unit syntax

| | Descriptor |
|---|---|
| coding_unit( x0, y0, cbWidth, cbHeight, treeType ) { | |
| ... | |
| if( slice_type = = B ) | |
| inter_pred_idc[ x0 ][ y0 ] | ae(v) |
| if( sps_affine_enabled_flag && cbWidth >= 16 && cbHeight >= 16 ) { | |
| inter_affine_flag[ x0 ][ y0 ] | ae(v) |
| if( sps_affine_type_flag && inter_affine_flag[ x0 ][ y0 ]) | |
| cu_affine_type_flag[ x0 ][ y0 ] | ae(v) |
| } | |
| if( inter_pred_idc[ x0 ][ y0 ] == PRED_BI && BiDirPredFlag && inter_affine_flag[ x0 ][ y0 ] == 0 ) | |
| symmetric_mvd_flag[ x0 ][ y0 ] | ae(v) |
| if( inter_pred_idc[ x0 ][ y0 ] != PRED_L1 ) { | |
| if( num_ref_idx_l0_active_minus1 > 0 && !symmetric_mvd_flag[ x0 ][ y0 ] ) | |
| ref_idx_l0[ x0 ][ y0 ] | ae(v) |
| mvd_coding( x0, y0, 0, 0 ) | |
| if( MotionModelIdc[ x0 ][ y0 ] > 0 ) | |
| mvd_coding( x0, y0, 0, 1 ) | |
| if(MotionModelIdc[ x0 ][ y0 ] > 1 ) | |
| mvd_coding( x0, y0, 0, 2 ) | |
| mvp_l0_flag[ x0 ][ y0 ] | ae(v) |
| } else { | |
| MvdL0[ x0 ][ y0 ][ 0 ] = 0 | |
| MvdL0[ x0 ][ y0 ][ 1 ] = 0 | |
| } | |
| if( inter_pred_idc[ x0 ][ y0 ] != PRED_L0 ) { | |
| if( num_ref_idx_l1_active_minus1 > 0 && !symmetric_mvd_flag[ x0 ][ y0 ] ) | |
| ref_idx_l1[ x0 ][ y0 ] | ae(v) |
| if( mvd_l1_zero_flag && inter_pred_idc[ x0 ][ y0 ] = = PRED_BI ) { | |
| ... | |
| } else { | |
| if( !symmetric_mvd_flag[ x0 ][ y0 ] ) { | |
| mvd_coding( x0, y0, 1, 0 ) | |
| if( MotionModelIdc[ x0 ][ y0 ] > 0 ) | |
| mvd_coding( x0, y0, 1, 1 ) | |
| if(MotionModelIdc[ x0 ][ y0 ] > 1 ) | |
| mvd_coding( x0, y0, 1, 2 ) | |
| } | |
| mvp_l1_flag[ x0 ][ y0 ] | ae(v) |
| } else { | |
| MvdL1[ x0 ][ y0 ][ 0 ] = 0 | |
| MvdL1[ x0 ][ y0 ][ 1 ] = 0 | |
| } | |
| ... | |
| } | |
| } | |
| ... | |
| } | |

3. EXAMPLES OF PROBLEMS SOLVED BY EMBODIMENTS

In LIC, two parameters including scaling parameter a and offset b need to be derived by using neighboring reconstructed samples, which may cause latency issue.

The set of allowed weighting factors used in GBI are fixed, which may be inefficient.

4. EXAMPLES OF EMBODIMENTS

Hereinafter, a block is used to represent a transform unit (TU)/prediction unit (PU)/coding unit (CU)/a sub-block within one TU/PU/CU etc. Suppose the coordinate of the top-left corner a block is (x, y), and the width and height of the block are W and H.

The detailed techniques below should be considered as examples to explain general concepts. These techniques should not be interpreted in a narrow way. Furthermore, these inventions can be combined in any manner.

In the following discussion, SatShift(x, n) is defined as $$SatShift(x, n) = \begin{cases} (x + \text{offset0}) \gg n & \text{if } x \geq 0 \\ -((-x + \text{offset1})) \gg n & \text{if } x < 0 \end{cases}$$

Shift(x, n) is defined as Shift(x, n)=(x+offset0)>>n.

In one example, offset0 and/or offset1 are set to (1<<n)>>1 or (1<<(n−1)). In another example, offset0 and/or offset1 are set to 0.

Clip3(min, max, x) is defined as $$\mathrm{Clip3}(\mathrm{Min}, \mathrm{Max}, x) = \begin{cases} \mathrm{Min} & \text{if } x < \mathrm{Min} \\ \mathrm{Max} & \text{if } x > \mathrm{Max} \\ x & \text{Otherwise} \end{cases}$$

LIC Improvements

A LIC-based framework is proposed wherein one or multiple history LIC parameter tables (HLICTs) with stored sets of LIC parameters are maintained according to decoding order. In the proposed framework, for some LIC coded blocks, the associated LIC parameters (either signaled or derived on-the-fly, such as based on neighboring reconstructed samples/neighboring prediction samples) may be used to update HLICTs; while for other LIC coded blocks, they may depend on the stored sets of LIC parameters in HLICTs.

1. The signaled or derived sets of LIC parameters may be directly added to HLICTs.
   a. In one example, only partial of a set of LIC parameters may be used to update HLICTs.
      i. In one example, HLICTs may only contain partial of set of LIC parameters, such as scaling parameter a.
      ii. In one example, scaling parameter a may be used to update HLICTs.
      iii. Alternatively, furthermore, when the stored LIC parameters (e.g., a) are utilized to code one block, the other parameter (such as offset b) may be derived on-the-fly.
      iv. Alternatively, furthermore, when the stored LIC parameters (e.g., a) are utilized to code one block, the other parameter (such as offset b) may be set to default values.
   b. In one example, LIC parameters may be firstly quantized and then utilized to update HLICTs.
      i. Alternatively, partial of a set of LIC parameters may be quantized and then utilized to update HLICTs.
      ii. When the quantized LIC parameters stored in HLICTs are used, they are firstly de-quantized.
   c. In one example, LIC parameters may be firstly clipped and then utilized to update HLICTs.
      i. In one example, LIC parameters may be quantized, then clipped, and then utilized to update HLICTs.
         1. For example, a'=SatShift(a, N), a"=Clip3 (MinV, MaxV, a'), and a" is used to update HLICTs. In one example, N=2, MinV=−128, MaxV=127.
         2. When the stored a" is used, a'"=a"<<N instead.
2. HLICTs may be updated in a first-in-first-out order.
   a. In one example, when one block's LIC parameters are utilized to update one or multiple HLICTs, such information is added to a new entry following the last entry in the HLICTs, and the number of available entries in HLICTs is increased by 1.
   b. In one example, if the number of available entries in HLICTs reaches a maximum number, one entry, such as the first entry, in the HLICTs is removed and the number of available entries in HLICTs is decreased by 1.
   c. Alternatively, pruning may be applied to stored LIC parameters in one HLICT.
      i. For example, if the new information to be added into the HLICTs is same or similar to the information in an existing entry of HLICTs, the new information is not added to the HLICTs.
   d. In one example, pruning among LIC parameters may be defined as comparing the scaling parameter.
      i. Alternatively, pruning may be defined as comparing the scaling parameter and offset values.
      ii. Alternatively, pruning may be defined as comparing the scaling parameter and offset values and reference picture index.
      iii. Alternatively, pruning may be defined as comparing the scaling parameter and offset values and reference picture picture-order-count (POC) value.
   e. In one example, if identical LIC parameters are found in the HLICT, all LIC parameters after it may be moved forward and the identical LIC parameters may be moved to the last entry of the HLICT.
3. One or multiple history LIC parameter tables may be maintained, and one or multiple index may be signaled to indicate which set of LIC parameter may be used for coding a block, such as AMVP-coded (AMVP mode or AMVP mode with SMVD) LIC block.
   a. Number of HLICTs or/and maximum length of HLICTs may be pre-defined or signaled in sequence parameter set (SPS)/video parameter set (VPS)/picture parameter set (PPS)/sequence header/slice header/picture header/tile group header/other kinds of video units.
      i. In one example, number of HLICTs may depend on number of reference pictures.
      ii. In one example, number of HLICTs may depend on number of reference picture lists.
      iii. In one example, number of HLICTs may depend on allowed modes for LIC coded blocks (such as affine or non-affine).
   b. For each reference picture, one HLICT may be maintained.
   c. Alternatively, HLICTs may be maintained only for some reference pictures.
      i. For example, LIC parameter table may be maintained only for the first reference picture of each prediction direction.
   d. LIC parameter table may be maintained for each reference picture pair. A reference picture pair include a reference picture from reference list 0 and a reference picture from reference list 1.
   e. LIC parameter table may be maintained for only some reference picture pairs.
      i. For example, LIC parameter table may be maintained for only one reference picture pair: the first reference picture in prediction direction 0 and the first reference picture in prediction direction 1.
   f. Alternatively, furthermore, multiple HLICTs may be maintained which may depend on the coded mode information, such as affine or non-affine mode.
   g. For a LIC block, an index may be signaled for each reference picture.
      i. Alternatively, if a LIC block is bi-predicted, only one index may be signaled for prediction direction 0 or 1.
      ii. Alternatively, if a LIC block is bi-predicted, one index may be signaled to indicate which LIC parameter of the reference picture pair is used.
      iii. Alternatively, if a block is bi-predicted and there is no LIC parameter table for its reference picture pair, LIC is disabled implicitly and LIC flag is constrained to be false.

iv. Alternatively, if a block is bi-predicted and there is no LIC parameter table for its reference picture pair, LIC is disabled implicitly and LIC flag and LIC parameter index are not signaled.

h. Default LIC parameter tables may be predefined for each reference picture or/and each reference picture pair or/and some reference picture pairs.

i. LIC flag and/or set of LIC parameters may be inherited from merge candidates and are not signaled in merge mode or/and UMVE mode.

i. Alternatively, LIC flag and LIC parameter may be inherited only from spatial merge candidates.

ii. Alternatively, LIC flag may be inherited from merge candidates and is not signaled in merge mode or/and UMVE mode. However, LIC parameter index may be still signaled when the inherited LIC flag is true.

Figure 16:
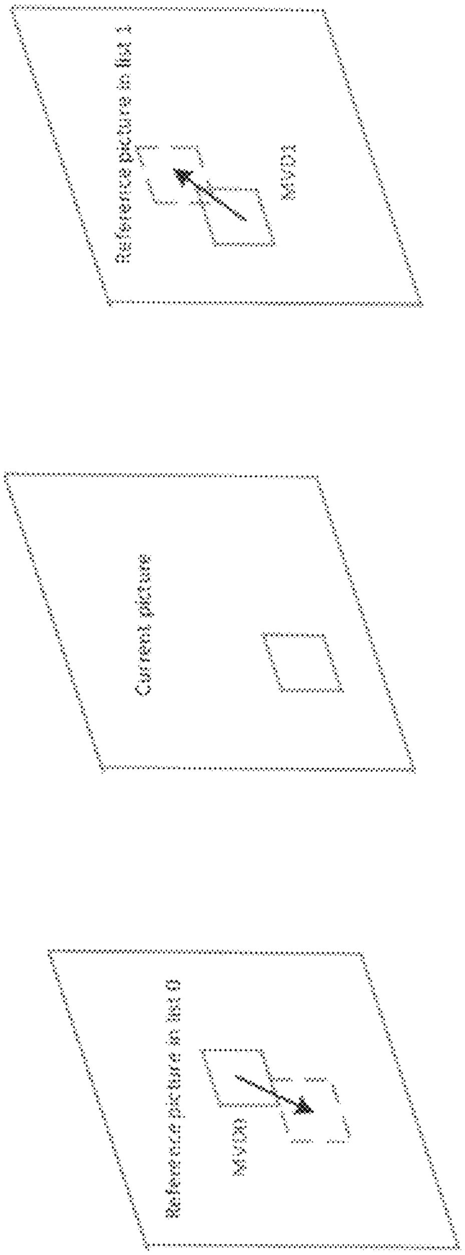
FIG. 16 shows an example of symmetrical mode.
Figure 17:
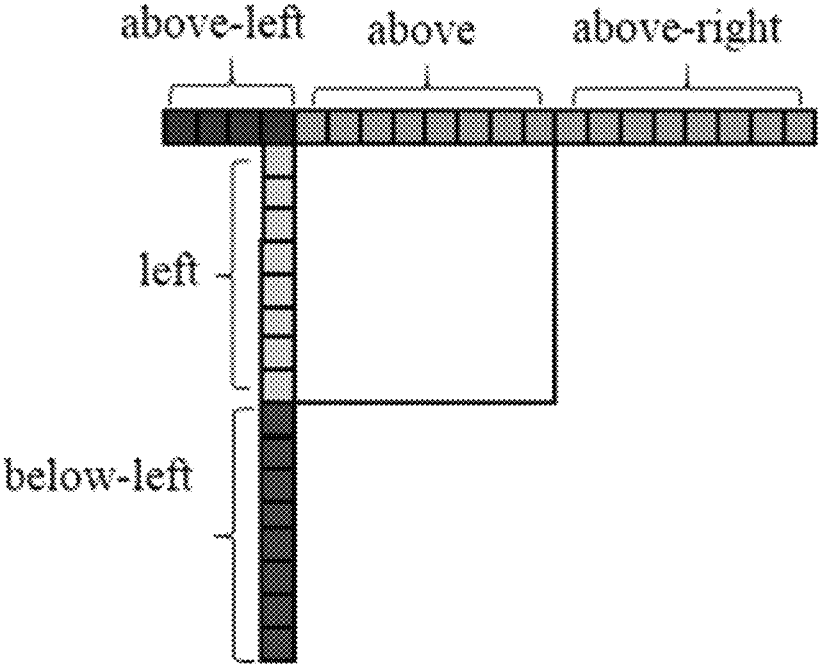
FIG. 17 shows an example of neighboring samples used in deriving the LIC parameters or generalized bi-prediction (GBI or GBi) weight.

4. HLICTs may be updated after encoding/decoding a block.

a. In one example, LIC parameters may be derived for blocks located at CTU boundary or CTU row boundary only. Alternatively, furthermore, the derived sets of LIC parameters may be used to update HLICTs.

b. Some available neighboring reconstructed pixels (an example is shown in FIG. 16) and their corresponding reference pixels may be used for derivation of the LIC parameters.

i. In one example, the above neighboring pixels may be used.

ii. In one example, the left neighboring pixels may be used.

iii. In one example, the above and left neighboring pixels may be used.

iv. In one example, the above-right neighboring pixels may be used.

v. In one example, the below-left neighboring pixels may be used.

vi. In one example, the left and below-left neighboring pixels may be used.

vii. In one example, the above and above-right neighboring pixels may be used.

viii. In above examples, left/above/below-left/above-right neighbouring pixels may be defined as those relative to the current coded block/the current prediction unit/the current coding tree unit (CTU)/the current Virtual Pipelining Data Unit (VPDU).

ix. In one example, the used neighboring pixels may be subsampled by a factor N (N>=1).

x. In one example, only pixels located at (x−1, y), (y−1, x), (x−1, y+H−1) and (x+W−1, y−1) may be used.

xi. In one example, only pixels located at (x−1, y), (y−1, x), (x−1, y+H) and (x+W, y−1) may be used.

xii. In one example, only pixels located at (x−1, y), (y−1, x), (x−1, y+H/2−1) and (x+W/2−1, y−1) may be used.

xiii. In one example, only pixels located at (x−1, y), (y−1, x), (x−1, y+2*H−1) and (x+2*W−1, y−1) may be used.

xiv. Alternatively, in addition, only neighboring pixels in above CTU or/and above-left CTU may be used.

1. Alternatively, only neighboring pixels in above CTU or/and above-right CTU may be used.

2. Alternatively, only neighboring pixels in left CTU or/and above-left CTU may be used.

3. Alternatively, only neighboring pixels in left CTU and above CTU may be used.

xv. In one example, the corresponding reference pixels may be identified by the motion information of the current block.

xvi. In one example, the corresponding reference pixels may be identified by the modified motion information of the current block.

1. For example, the motion vector may be rounded to integer precision before used for identifying the reference pixels.

xvii. In one example, the neighbouring samples is treated as available only if the neighbouring samples and the current block belongs to the same tile;

xviii. In one example, the neighbouring samples is treated as available only if the neighbouring samples and the current block belongs to the same tile group;

5. LIC parameter tables may be updated before encoding/decoding a CTU or a video processing data unit (VPDU, such as 64×64)/or a region.

a. In one example, some neighboring/non-adjacent bi-predicted reconstructed pixels and the corresponding prediction pixels may be used for derivation of LIC parameters.

b. In one example, some neighboring/non-adjacent bi-predicted reconstructed pixels and the corresponding prediction pixels may be split into several sets according to the motion information, and LIC parameters are derived for each set.

i. For example, each set of pixels are with same motion information.

c. In one example, LIC parameters are derived after encoding/decoding a block at the right or/and bottom CTU boundary, and the derived LIC parameters may be used for updating the LIC parameter tables of the following coded CTUs.

d. In one example, LIC parameters are derived after encoding/decoding a block, and the derived LIC parameters may be used for updating the LIC parameter table of the following coded CTUs.

e. In one example, only partial pixels of the block may be used for derivation of LIC parameters.

i. For example, every Nth row/column.

ii. For example, four corner pixels.

iii. For example, samples cross VPDU boundary may be not used.

f. Alternatively, in addition, whether a block is used to derive the LIC parameter or not may depend on the coding mode or/and motion information or/and size of the block.

i. For example, blocks coded in affine mode may be not used for derivation of the LIC parameter.

ii. For example, blocks with width or/and height or/and size no larger (or no smaller) than a threshold X may be not used for derivation of the LIC parameter.

iii. For example, blocks coded with weighted prediction or GBI may be not used for derivation of the weight.

iv. For example, blocks coded with CIIP mode may be not used for derivation of the LIC parameter.

v. For example, only LIC mode blocks may be used for derivation of LIC parameters.

6. LIC parameter tables may be derived at encoder and signaled to decoder at SPS/VPS/PPS/slice header/tile group header/tile header.
   a. In one example, for each picture/slice/tile/tile group/CTU group, LIC parameter tables may be derived at encoder and signaled to decoder.
   b. For a picture/slice/tile/tile group/CTU group, it may inherit the LIC table of some previous encoded/decoded picture/slice/tile/tile group/CTU group.
   c. In one example, LIC parameter table may be signaled for each reference picture.
   d. In one example, LIC parameter table may be signaled for some reference pictures.
      i. For example, LIC parameter table may be signaled for the first reference picture in each prediction direction.
   e. In one example, LIC parameter may be quantized before signaling and the quantization step may be signaled in the SPS/VPS/PPS/slice header/tile group header/tile header.
      i. In one example, LIC parameter may be first left shifted by K and then quantized. K may be different for scaling parameter and offset parameter.
      ii. K may be signaled or predefined at encoder and decoder.
      iii. In one example, only scaling parameter a may be quantized.
      iv. In one example, only offset parameter b may be quantized.
      v. In one example, both scaling parameter a and offset parameter b may be quantized, and different quantization step may be used for them.
   f. In one example, only scaling parameter a is signaled and offset parameter b is forced to be 0.
      i. Alternatively, offset parameter b is derived using method described in above bullets.
   g. In one example, only offset parameter b is signaled and scaling parameter a is forced to be 1.
      i. Alternatively, scaling parameter a is derived using method described in above bullets.

Interaction of LIC with HMVP

7. LIC flag and/or LIC parameters may be stored in the HMVP tables in addition to the stored motion information in the current design.
   a. LIC flag and/or LIC parameter may be not considered when comparing two motion information. For example, LIC parameter may be not considered when comparing two motion information in merge list construction process or/and HMVP table construction process or/and AMVP list construction process.
   b. Alternatively, LIC flag and/or LIC parameters may be not stored in the HMVP tables.
   c. In one example, for LIC coded blocks, the associated motion information are not utilized to update HMVP tables.

GBI Improvement

8. Weight table used in GBI may be updated after encoding/decoding a bi-predicted block.
   a. In one example, a weight, i.e., w1 in equation (2), may be derived for bi-predicted blocks located at CTU boundary, and may be used to update the weight table.
   b. Some available neighboring reconstructed pixels and their corresponding reference pixels may be used for derivation of the weight.
      i. In one example, the above neighboring pixels may be used.
      ii. In one example, the left neighboring pixels may be used.
      iii. In one example, the above and left neighboring pixels may be used.
      iv. In one example, the above-right neighboring pixels may be used.
      v. In one example, the below-left neighboring pixels may be used.
      vi. In one example, the left and below-left neighboring pixels may be used.
      vii. In one example, the above and above-right neighboring pixels may be used.
      viii. In one example, the used neighboring pixels may be subsampled by a factor N (N>=1).
      ix. In one example, only pixels located at (x−1, y), (y−1, x), (x−1, y+H−1) and (x+W−1, y−1) may be used.
      x. In one example, only pixels located at (x−1, y), (y−1, x), (x−1, y+H) and (x+W, y−1) may be used.
      xi. In one example, only pixels located at (x−1, y), (y−1, x), (x−1, y+H/2−1) and (x+W/2−1, y−1) may be used.
      xii. In one example, only pixels located at (x−1, y), (y−1, x), (x−1, y+2*H−1) and (x+2*W−1, y−1) may be used.
      xiii. Alternatively, in addition, only neighboring pixels in above CTU or/and above-left CTU may be used.
         1. Alternatively, only neighboring pixels in above CTU or/and above-right CTU may be used.
         2. Alternatively, only neighboring pixels in left CTU or/and above-left CTU may be used.
         3. Alternatively, only neighboring pixels in left CTU and above CTU may be used.
      xiv. In one example, the corresponding reference pixels may be identified by the motion information of the current block.
      xv. In one example, the corresponding reference pixels may be identified by the modified motion information of the current block.
         1. For example, the motion vector may be rounded to integer precision before used for identifying the reference pixels.
9. Weight table may be updated before encoding/decoding a CTU or a video processing data unit (VPDU, such as 64×64)/or a region.
   a. In one example, some neighboring/non-adjacent bi-predicted reconstructed pixels and the corresponding prediction pixels may be used for derivation of weights.
   b. In one example, some neighboring/non-adjacent bi-predicted reconstructed pixels and the corresponding prediction pixels may be split into several sets according to the motion information, and a weight is derived for each set.
      i. For example, each set of pixels are with same motion information.
   c. In one example, a weight is derived after encoding/decoding a bi-predicted block at the right or/and bottom CTU boundary, and the derived weights may be used for updating the weight table of the following coded CTUs.
   d. In one example, a weight is derived after encoding/decoding a bi-predicted block, and the derived weights may be used for updating the weight table of the following coded CTUs.

e. In one example, only partial pixels of the block may be used for derivation of the weight.
   ii. For example, every Nth row/column.
   iii. For example, four corner pixels.
   iv. For example, samples cross VPDU boundary may be not used.

f. In one example, the Weight table is reset to the default value when
   i. a CTU is to be encoded/decoded
   ii. a CTU row is to be encoded/decoded
   iii. a picture/slice/tile group is to be encoded/decoded
   iv. a tile is to be encoded/decoded g. Alternatively, in addition, whether a block is used to derive the weight or not may depend on the coding mode or/and motion information or/and size of the block.
   i. For example, blocks coded in affine mode may be not used for derivation of the weight.
   ii. For example, blocks with width or/and height or/and size no larger (or no smaller) than a threshold X may be not used for derivation of the weight.
   iii. For example, blocks coded with weighted prediction or LIC may be not used for derivation of the weight.
   iv. For example, blocks coded with CIIP mode may be not used for derivation of the weight.
   v. For example, only GBI mode blocks may be used for derivation of GBI weight.

10. Only one weight table may be maintained in GBI, and reference picture information may be not considered.
   a. Alternatively, the weight table may be maintained for each pair of reference picture.
   b. Alternatively, the weight table may be maintained for some pairs of reference picture.
   c. Alternatively, the weight table may be maintained for only one reference picture pair: the first reference picture in prediction direction 0 and first reference picture in prediction direction 1. For other reference picture pairs, default weight table may be always used.
   d. In one example, if a block is bi-predicted and there is no weight table for its reference picture pair, GBI is disabled implicitly and GBI index is not signaled.
   e. In one example, besides the default weight table, N (N>0) additional weights may be inserted into the weight table.
      i. In one example, the additional weights may be inserted after the default weights.
      ii. In one example, the additional weights may be inserted before the default weights.
      iii. In one example, the additional weights may be interleaved with the default weights.
   f. In one example, derived weights may be used to replace the default weights.
   g. Alternatively, method described in P1805028401H may be used to maintain the weight table.
   h. In one example, the weight table may be reset to the default weight table at the beginning of CTU row or/and slice or/and tile or/and tile group or/and picture.

11. Number of weight tables or/and maximum size of weight tables may be signaled in SPS/VPS/PPS/slice header/tile group header/tile header.

12. Default weight table used in GBI may be reordered after encoding/decoding a block.
   a. In one example, a default count is assigned to each weight. After encoding/decoding a block, count of the corresponding weight is increased by N (e.g., N=1), and the weight table is reordered in descending count order.
   b. In one example, the count of all weights is reset to default count at the beginning of CTU or/and CTU row or/and slice or/and tile or/and tile group or/and picture.

Figure 18:
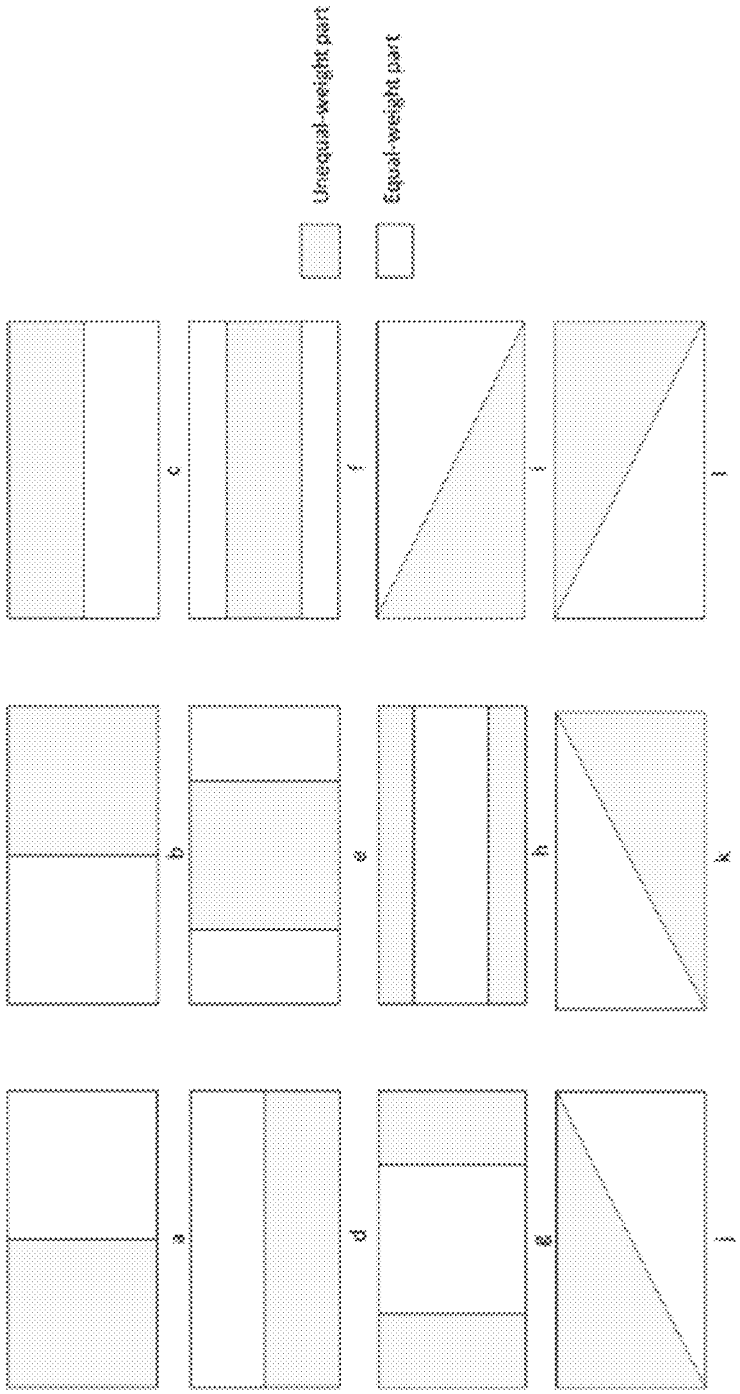
FIG. 18 shows an example usage of unequal-weight.

13. When unequal-weight is selected in GBI mode, it may be applied only to some pixels of the block.
   a. In one example, unequal-weight is applied only when absolute difference of the two prediction pixels is no smaller than a threshold X (X>=0).
   b. In one example, unequal-weight is applied only when absolute difference of the two prediction pixels is no larger than a threshold X (X>=0).
   c. In one example, unequal-weight is applied only when absolute difference of the two prediction pixels is in the range [X Y] (Y>=X).
   d. In one example, unequal-weight is applied to the left half pixels, as shown in FIG. 18*a*.
   e. In one example, unequal-weight is applied to the right half pixels, as shown in FIG. 18*b*.
   f. In one example, unequal-weight is applied to the above half pixels, as shown in FIG. 18*c*.
   g. In one example, unequal-weight is applied to the bottom half pixels, as shown in FIG. 18*d*.
   h. In one example, unequal-weight is applied to the central half pixels, as shown in FIGS. 18*e* and *f*.
   i. In one example, unequal-weight is not applied to the central half pixels, as shown in FIGS. 18*g* and *h*.
   j. In one example, unequal-weight is applied to the bottom-left triangle part, as shown in FIG. 18*i*.
   k. In one example, unequal-weight is applied to the top-left triangle part, as shown in FIG. 18*j*.
   l. In one example, unequal-weight is applied to the bottom-right triangle part, as shown in FIG. 18*k*.
   m. In one example, unequal-weight is applied to the top-right triangle part, as shown in FIG. 18*l*.
   n. In one example, some candidates in FIGS. 18*a*-1 may be allowed, and an index indicating which candidate is selected may be signaled for unequal-weight GBI mode.

14. GBI weight tables may be derived at encoder and signaled to decoder at SPS/VPS/PPS/slice header/tile group header/tile header.
   a. In one example, for each picture/slice/tile/tile group/CTU group, GBI weight tables may be derived at encoder and signaled to decoder.
   b. For a picture/slice/tile/tile group/CTU group, it may inherit the GBI weight table of some previous encoded/decoded picture/slice/tile/tile group/CTU group.
   c. In one example, GBI weight table may be signaled for each reference picture pair.
   d. In one example, GBI weight table may be signaled for some reference pictures pair.
      i. For example, GBI weight table may be signaled for one reference picture pair: the first reference picture in prediction direction 0 and the first reference picture in prediction direction 1.

e. In one example, GBI weight may be quantized before signaling and the quantization step may be signaled in the SPS/VPS/PPS/slice header/tile group header/tile header.

i. Alternatively, GBI weight may be first left shifted by K and then quantized. In this case, K may be signaled or predefined at encoder and decoder.

15. Derivation of LIC parameter or/and GBI weight may depend on Virtual Pipelining Data Units (VPDU).

a. In one example, if a block or/and its neighboring samples cross VPDU boundary and span N VPDUs, only samples within one same VPDU (maybe any one of the spanned VPDUs) may be used in derivation of LIC parameters or/and GBI weight.

b. In one example, if a block or/and its neighboring samples cross VPDU boundary and span N VPDUs, LIC parameters or/and GBI weight may be derived for each VPDU.

c. In one example, if a block or/and its neighboring samples cross VPDU boundary and span N VPDUs, LIC parameters or/and GBI weight may be derived for K (K>=1) VPDUs. For example, K=1.

16. The above proposed method may be applied under certain conditions, such as block sizes, slice/picture/tile types, or motion information.

a. In one example, when a block size contains smaller than M*H samples, e.g., 16 or 32 or 64 luma samples, proposed method is not allowed.

b. Alternatively, when minimum size of a block's width or/and height is smaller than or no larger than X, proposed method is not allowed. In one example, X is set to 8.

c. Alternatively, when minimum size of a block's width or/and height is no smaller than X, proposed method is not allowed. In one example, X is set to 8.

d. Alternatively, when a block's width>th1 or >=th1 and/or a block's height>th2 or >=th2, proposed method is not allowed. In one example, th1 and/or th2 is set to 8.

e. Alternatively, when a block's width<th1 or <=th1 and/or a block's height<th2 or <a=th2, proposed method is not allowed. In one example, th1 and/or th2 is set to 8.

17. Whether to enable or disable the above methods may be signaled in SPS/PPS/VPS/sequence header/picture header/slice header/tile group header/tile/group of CTUs, etc. al.

a. Alternatively, which method to be used may be signaled in SPS/PPS/VPS/sequence header/picture header/slice header/tile group header/tile/group of CTUs, etc. al.

b. Alternatively, whether to enable or disable the above methods and/or which method to be applied may be dependent on block dimension, Virtual Pipelining Data Units (VPDU), picture type, low delay check flag, coded information of current block (such as reference pictures, uni or bi-prediction) or previously coded blocks.

Figure 19:
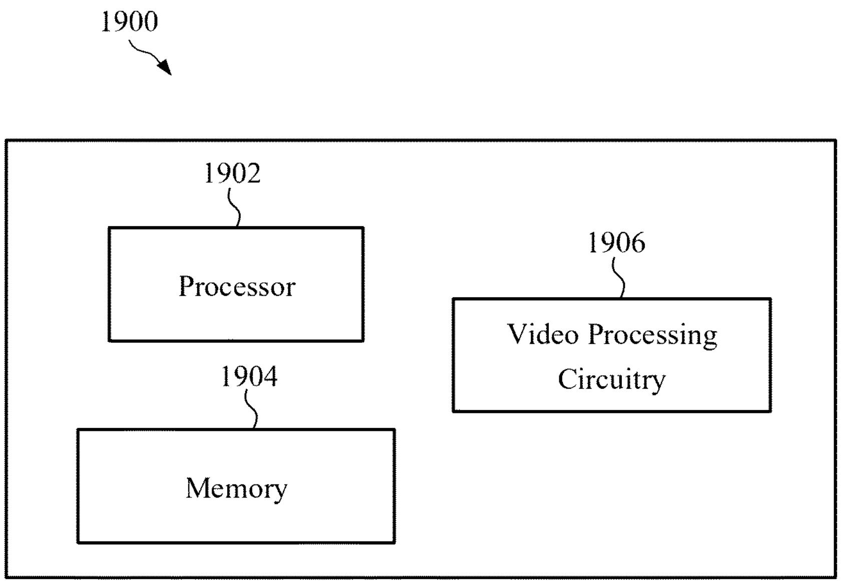
FIG. 19 is a block diagram of an example of a video processing apparatus.

FIG. 19 is a block diagram of a video processing apparatus 1900. The apparatus 1900 may be used to implement one or more of the methods described herein. The apparatus 1900 may be embodied in a smartphone, tablet, computer, Internet of Things (IoT) receiver, and so on. The apparatus 1900 may include one or more processors 1902, one or more memories 1904 and video processing hardware 1906. The processor(s) 1902 may be configured to implement one or more methods described in the present disclosure. The memory (memories) 1904 may be used for storing data and code used for implementing the methods and techniques described herein. The video processing hardware 1906 may be used to implement, in hardware circuitry, some techniques described in the present disclosure.

Figure 21:
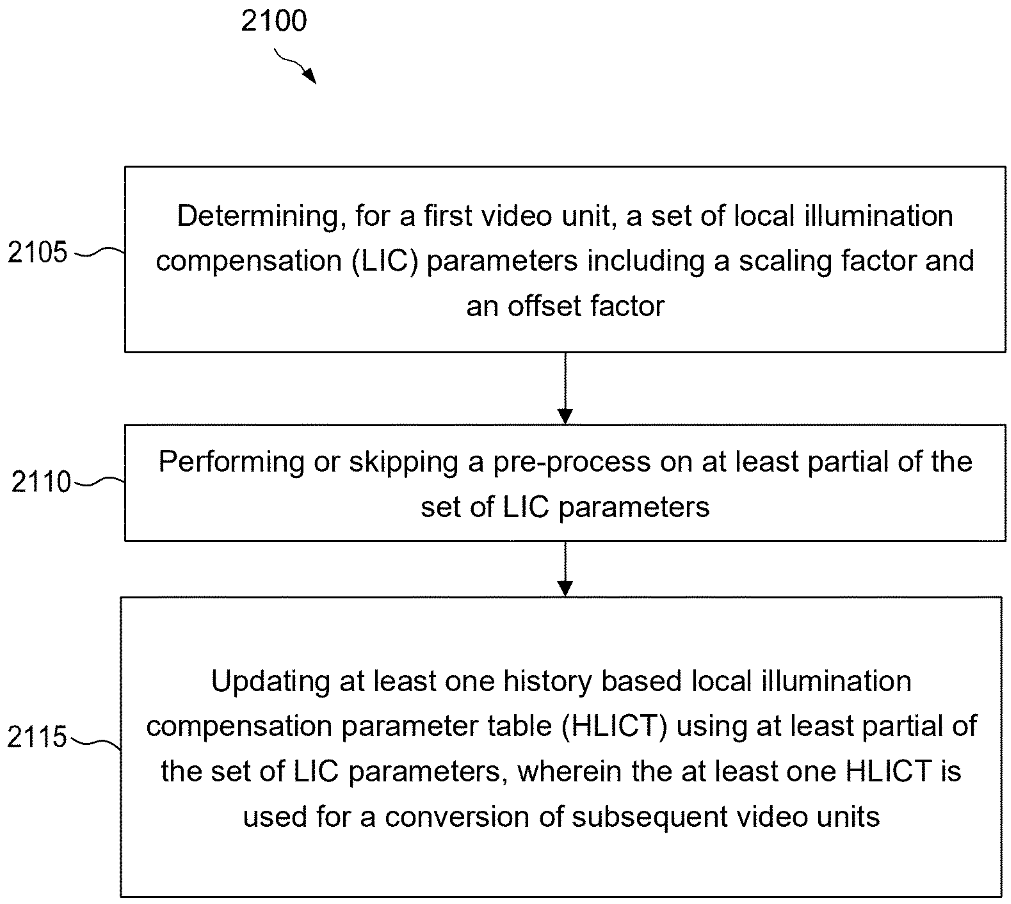
FIG. 21 is a flowchart for an example of a video processing method.

FIG. 21 is a flowchart for a method 2100 of processing a video. The method 2100 includes: determining (2105), for a first video unit, a set of local illumination compensation (LIC) parameters including a scaling factor and an offset factor; performing or skipping (2110) a pre-process on at least partial of the set of LIC parameters; and updating (2115) at least one history based local illumination compensation parameter table (HLICT) using at least partial of the set of LIC parameters, wherein the at least one HLICT is used for a conversion of subsequent video units.

Figure 22:
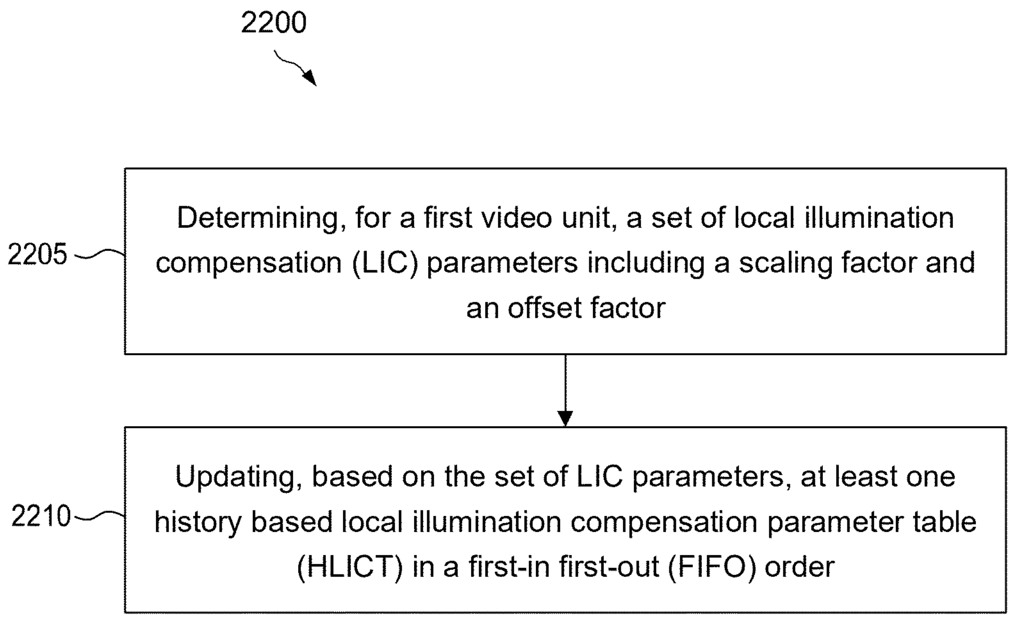
FIG. 22 is a flowchart for an example of a video processing method.

FIG. 22 is a flowchart for a method 2200 of processing a video. The method 2200 includes: determining (2205), for a first video unit, a set of local illumination compensation (LIC) parameters including a scaling factor and an offset factor; and updating (2210), based on the set of LIC parameters, at least one history based local illumination compensation parameter table (HLICT) in a first-in first-out (FIFO) order.

Figure 23:
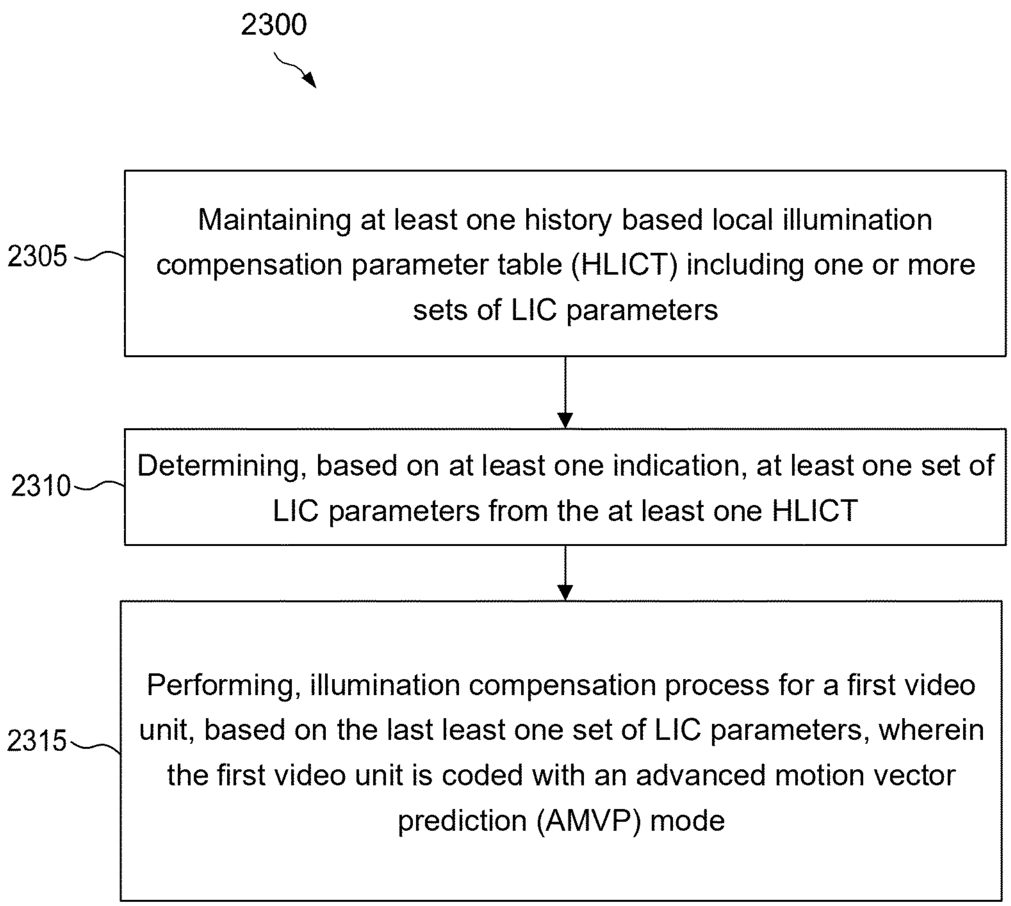
FIG. 23 is a flowchart for an example of a video processing method.

FIG. 23 is a flowchart for a method 2300 of processing a video. The method 2300 includes: maintaining (2305) at least one history based local illumination compensation parameter table (HLICT) including one or more sets of LIC parameters; and determining (2310), based on at least one indication, at least one set of LIC parameters from the at least one HLICT, performing (2315), illumination compensation process for a first video unit, based on the at least one set of LIC parameters, wherein the first video unit is coded with an advanced motion vector prediction (AMVP) mode.

Figure 24:
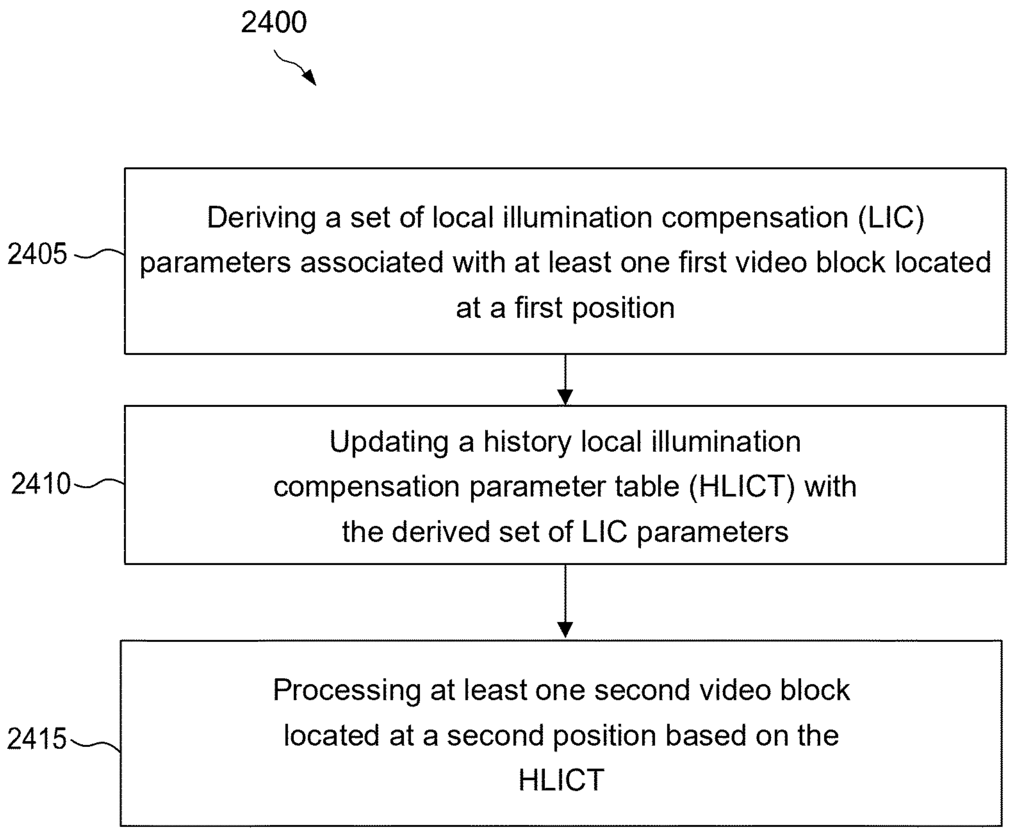
FIG. 24 is a flowchart for an example of a video processing method.

FIG. 24 is a flowchart for a method 2400 of processing a video. The method 2400 includes: deriving (2405) a set of local illumination compensation (LIC) parameters associated with at least one first video block located at a first position; updating (2410) a history local illumination compensation parameter table (HLICT) with the derived set of LIC parameters; and processing (2415) at least one second video block located at a second position based on the HLICT.

Figure 25:
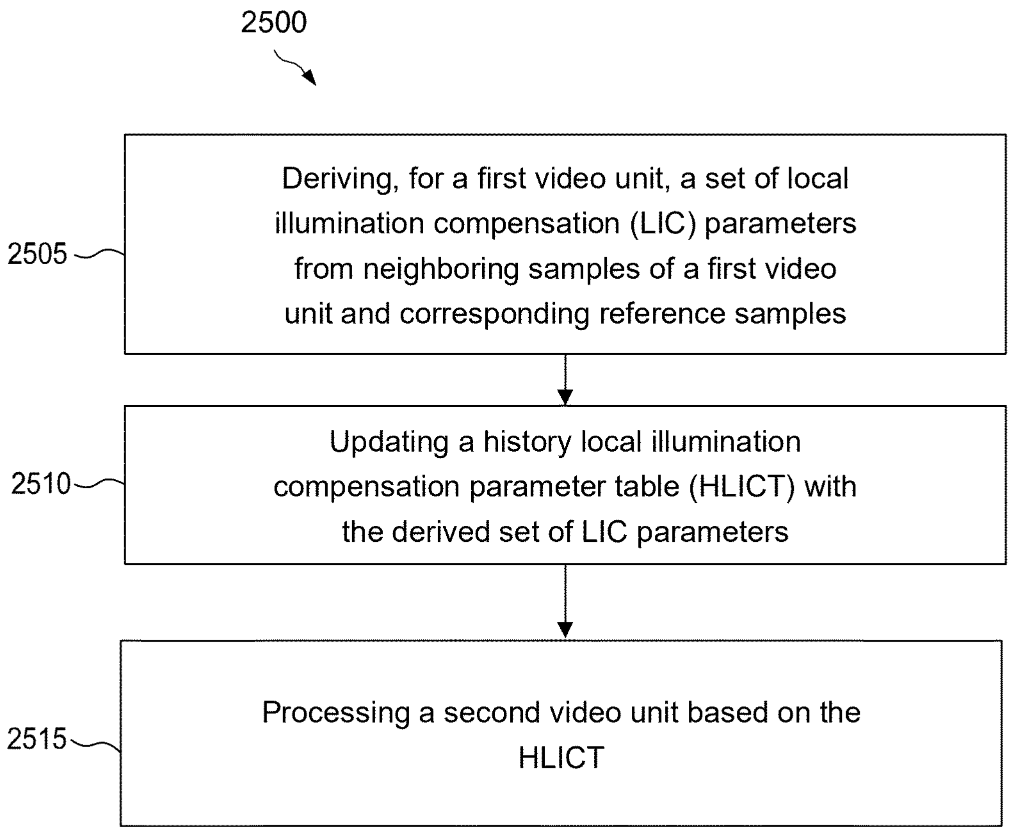
FIG. 25 is a flowchart for an example of a video processing method.

FIG. 25 is a flowchart for a method 2500 of processing a video. The method 2500 includes: deriving (2505), for a first video unit, a set of local illumination compensation (LIC) parameters from neighboring samples of a first video unit and corresponding reference samples; updating (2510) a history local illumination compensation parameter table (HLICT) with the derived set of LIC parameters; and processing (2515) a second video unit based on the HLICT.

Figure 26:
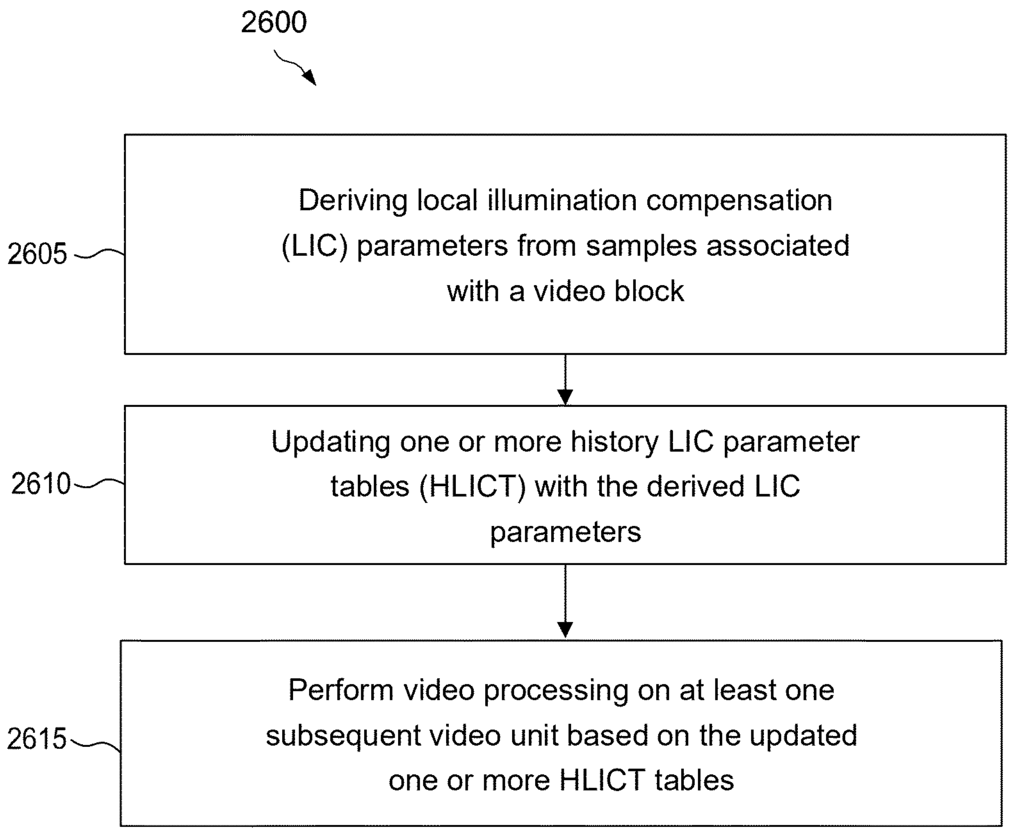
FIG. 26 is a flowchart for an example of a video processing method.

FIG. 26 is a flowchart for a method 2600 of processing a video. The method 2600 includes: deriving (2605) local illumination compensation (LIC) parameters from samples associated with a video block; updating (2610) one or more history LIC parameter tables (HLICT) with the derived LIC parameters; and perform (2615) video processing on at least one subsequent video unit based on the updated one or more HLICT tables.

Figure 27:
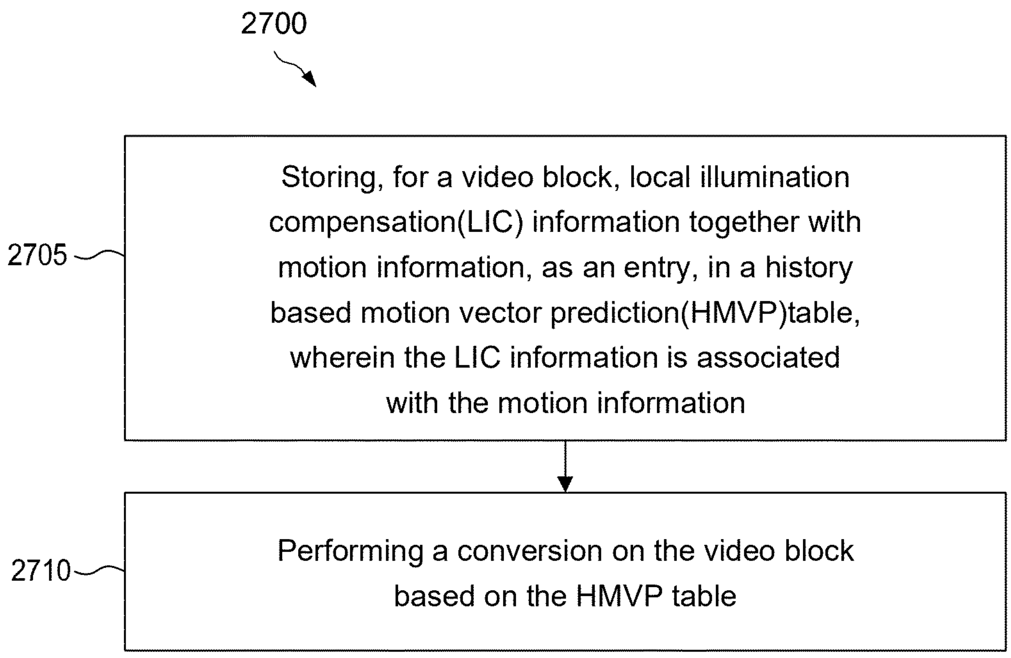
FIG. 27 is a flowchart for an example of a video processing method.

FIG. 27 is a flowchart for a method 2700 of processing a video. The method 2700 includes: storing (2705), for a video block, local illumination compensation (LIC) information together with motion information, as an entry, in a history based motion vector prediction (HMVP) table, wherein the LIC information is associated with the motion information; and performing (2710) a conversion on the video block based on the HMVP table.

With reference to methods 2100, 2200, 2300, 2400, 2500, 2600 and 2700, some examples and their use are described in Section 4 of the present disclosure. For example, as described in Section 4, video blocks can be processed using in accordance with local illumination compensation.

With reference to methods 2100, 2200, 2300, 2400, 2500, 2600 and 2700, a video block may be encoded in the video bitstream in which bit efficiency may be achieved by using a bitstream generation rule related to local illumination compensation.

In one example aspect, a method of processing video is disclosed. The method includes determining, for a first video unit, a set of local illumination compensation (LIC) parameters including a scaling factor and an offset factor; performing or skipping a pre-process on at least partial of the set of LIC parameters; and updating at least one history based local illumination compensation parameter table (HLICT) using at least partial of the set of LIC parameters, wherein the at least one HLICT is used for a conversion of subsequent video units.

In one example, the set of local illumination compensation (LIC) parameters is derived from neighboring samples associated with the first video unit.

In one example, the neighboring samples associated with the first video unit are neighboring reconstructed samples or neighboring predicted samples generated from one or more reference pictures.

In one example, the pre-process comprises: quantizing the at least partial of the set of LIC parameters.

In one example, the quantizing is performed as follows:

$$SatShift(x, n) = \begin{cases} (x + \text{offset0}) \gg n & \text{if } x \geq 0 \\ -((-x + \text{offset1})) \gg n & \text{if } x < 0 \end{cases}$$

wherein Shift(x, n) is defined as Shift(x, n)=(x+offset0)>>n, x representing a value of the at least partial of the set of LIC parameters to be quantized.

In one example, at least one of offset0 and offset1 is set to (1<<n)>>1 or (1<<(n−1)).

In one example, at least one of offset0 and offset1 is set to 0.

In one example, n=2.

In one example, the pre-process further comprises: clipping the at least partial of the set of LIC parameters.

In one example, the clipping is performed as follows:

$$\text{Clip3}(\text{Min}, \text{Max}, x) = \begin{cases} \text{Min} & \text{if } x < \text{Min} \\ \text{Max} & \text{if } x > \text{Max} \\ x & \text{Otherwise} \end{cases}$$

wherein x represents a value of the at least partial of the set of LIC parameters to be clipped.

In one example, Min=−128, and Max=127.

In one example, the at least partial of the set of LIC parameters is quantized before being clipped.

In one example, the updating comprises: storing the at least partial of the set of LIC parameters into the at least one HLICT to update the HLICT.

In one example aspect, a method of processing video is disclosed. The method includes determining, for a first video unit, a set of local illumination compensation (LIC) parameters including a scaling factor and an offset factor; andupdating, based on the set of LIC parameters, at least one history based local illumination compensation parameter table (HLICT) in a first-in first-out (FIFO) order.

In one example, updating the HLICT includes: determining whether a number of entries of the HLICT reaches a threshold, and removing a first entry from the HLICT and the number of available entries in the HLICT is decreased by 1 if the number of entries reaches the threshold.

In one example, at least partial of the set of LIC parameters is inserted into the HLICT as a last entry to update the HLICT, and the number of available entries in the HLICT is increased by 1.

In one example, the method further comprises: preforming a pruning process to determine whether to insert the at least partial of the set of LIC parameters into the HLICT.

In one example, the pruning process comprises: comparing the at least partial of the set of LIC parameters with each of all existing entries in the HLICT, and determining that no insertion is performed if they are same or similar.

In one example, the method further comprises: comparing a value of a reference picture index or reference picture picture-order-count (POC) associate with the at least partial of the set of LIC parameters with that associated with each of all existing entries.

In one example, if any of existing entries in the HLICT is identical to the at least partial of the set of LIC parameters, all entries after the identical entry are moved forward and the identical entry is moved afterward as a last entry in the HLICT.

In one example, the at least partial of the set of LIC parameters comprises both the scaling factor and the offset factor, or comprises only one of the scaling factor and the offset factor.

In one example, if the at least partial of the set of LIC parameters comprises only one of the scaling factor and the offset factor, the other of the scaling factor and the offset factor is derived or set as a default value.

In one example, the at least partial of the set of LIC parameters is the scaling factor.

In one example aspect, a method of processing video is disclosed. The method includes maintaining at least one history based local illumination compensation parameter table (HLICT) including one or more sets of LIC parameters; and determining, based on at least one indication, at least one set of LIC parameters from the at least one HLICT, performing, illumination compensation process for a first video unit, based on the at least one set of LIC parameters, wherein the first video unit is coded with an advanced motion vector prediction (AMVP) mode.

In one example, the at least one HLICT includes a plurality of HLICTs, and a number of HLICTs or a maximum length of each of the plurality of HLICTs is pre-defined or signaled in at least one of a picture parameter set (PPS), a sequence parameter set (SPS), a video parameter set (VPS), a sequence header, a slice header, a picture header, a tile group header, or other kinds of video units.

In one example, the number of HLICTs depends on a number of reference pictures or a number of reference picture lists of the first video unit.

In one example, the number of HLICTs depends on allowed coding modes of the first video unit.

In one example, one HLICT is maintained for each of one or more reference pictures.

In one example, at least one HLICT is maintained for specific reference pictures or all of reference pictures, or maintained for specific reference picture pairs or all of reference picture pairs.

In one example, the specific reference pictures comprise a first reference picture of each prediction direction.

In one example, each of all reference picture pairs comprises a reference picture from reference picture list 0 and a reference picture from reference picture list 1.

In one example, the specific reference picture pairs comprise only one reference pair including a first reference picture from reference picture list 0 and a first reference picture from reference picture list 1.

In one example, the allowed coding modes of the first video unit comprise at least one of an affine mode and a non-affine mode.

In one example, the at least one indication comprising a first indication indicating that which set of LIC parameters is used for each of the reference pictures.

In one example, if the first video unit is converted with a bi-prediction, the first indication indicating that which set of LIC parameters of the reference picture pairs is used for two reference pictures of the first video unit.

In one example, if the first video unit is converted with a bi-prediction and if there is no HLICT available for its reference picture pair, LIC is disabled for the first video unit implicitly.

In one example, a LIC flag is constrained to be false.

In one example, no LIC flag is signaled and the LIC flag is implicitly derived to be false.

In one example, at least one history based local illumination compensation parameter table (HLICT) comprises one or more default HLICTs which are defined for specific reference pictures or all of reference pictures, or for specific reference picture pairs or all of reference picture pairs for the first video unit.

In one example, a LIC flag is inherited from merge candidates of the first video unit to indicate whether LIC is applied to the first video unit.

In one example, the set of LIC parameter is inherited from merge candidates of the first video unit.

In one example, the merge candidates only comprise spatial merge candidates.

In one example, the at least one indication further comprises a LIC parameter index to indicate which set of LIC parameters is used if the inherited LIC flag indicates the LIC is applied to the first video unit.

In one example, the first video unit is coded in merge mode or ultimate motion vector expression (UMVE) mode.

In one example aspect, a method of processing video is disclosed. The method includes deriving a set of local illumination compensation (LIC) parameters associated with at least one first video block located at a first position; updating a history local illumination compensation parameter table (HLICT) with the derived set of LIC parameters; and processing at least one second video block located at a second position based on the HLICT.

In one example aspect, a method of processing video is disclosed. The method includes the first position is a boundary of coding tree unit (CTU).

In one example aspect, a method of processing video is disclosed. The method includes the first position is a boundary of a row of CTU.

In one example aspect, a method of processing video is disclosed. The method includes: deriving, for a first video unit, a set of local illumination compensation (LIC) parameters from neighboring samples of a first video unit and corresponding reference samples; updating a history local illumination compensation parameter table (HLICT) with the derived set of LIC parameters; and processing a second video unit based on the HLICT.

In one example, the neighboring samples of the first video unit comprises at least one of:

above neighboring samples;

left neighboring samples;

above and left neighboring samples;

above-right neighboring samples;

below-left neighboring samples;

left and below-left neighboring samples;

above and above-right neighboring samples.

In one example, the method further comprises: subsampling the neighboring samples by a factor N and deriving the set of LIC parameters from the sub-sampled neighboring samples, N>=1.

In one example, the neighboring samples have at least one of sets of coordinates as follows:

$$\{(x-1,y),(y-1,x),(x-1,y+H-1),(x+W-1,y-1)\};$$

$$\{(x-1,y),(y-1,x),(x-1,y+H),(x+W,y-1)\};$$

$$\{(x-1,y),(y-1,x),(x-1,y+H/2-1),(x+W/2-1,y-1)\};\text{ or}$$

$$\{(x-1,y),(y-1,x),(x-1,y+2*H-1),(x+2*W-1,y-1)\},$$

x, y representing coordinates of a top-left corner of the first video unit, and W, H representing a width and height of the first video unit respectively.

In one example, the neighboring samples comprise:

neighboring samples located in at least one of above and above-left CTUs;

neighboring samples located in at least one of above and above-right CTUs;

neighboring samples located in at least one of left and above-left CTUs; or neighboring samples located in left and above CTUs.

In one example, the corresponding reference samples are identified by using motion information associated with the first video unit.

In one example, the motion information is modified before being used to identify the corresponding reference samples.

In one example, the motion information comprises motion vectors, and modifying the motion information comprises rounding the motion vectors to integer precisions.

In one example, the neighboring samples and the first video unit belong to a same tile or a same tile group.

In one example, the first video unit comprises at least one of a current block, a current prediction unit, a current CTU, a current virtual pipelining data unit (VPDU).

In one example aspect, a method of processing video is disclosed. The method includes deriving local illumination compensation (LIC) parameters from samples associated with a video block; updating one or more history LIC parameter tables (HLICT) with the derived LIC parameters; and perform video processing on at least one subsequent video unit based on the updated one or more HLICT tables.

In one example, the samples comprise neighboring/non-adjacent bi-predicted reconstructed samples of the at least one subsequent video unit and the corresponding prediction samples.

In one example, at least one of neighboring/non-adjacent bi-predicted reconstructed samples of the at least one subsequent video unit and the corresponding prediction samples are split into a plurality of sets of samples, and the LIC parameters are derived from each set of samples.

In one example, same motion information is shared within each set of samples.

In one example, the video block is located at a right or bottom boundary of a CTU.

In one example, the at least one subsequent video unit comprises at least one of subsequent CTU or a VPDU.

In one example, the samples associated with the video block comprise only partial samples within the video block.

In one example, the partial samples are one of:

samples located in every Nth row and/or column; or samples located at four corners of the video block.

In one example, the partial samples exclude samples cross VPDU boundary.

In one example, a characteristic of the video block meets a specific condition.

In one example, the characteristic of the video block comprises at least one of a code mode, motion information, a size, a width and a height of the video block.

In one example, the code mode of the video block does not belong to any of the following: an affine mode, a weighted prediction, a generalized bi-prediction (GBI) or a combined inter and intra prediction (CIIP).

In one example, the video block is a LIC-coded block.

In one example, the size of the video block is larger a first threshold or smaller a second threshold.

In one example, at least one of the width and height of the video block is larger a third threshold or smaller a fourth threshold.

In one example, at least one LIC parameter table and the at least partial of the set of LIC parameters are signaled in at least one of a picture parameter set (PPS), a sequence parameter set (SPS), a video parameter set (VPS), a slice header, a tile group header and a tile header.

In one example, the at least one LIC parameter table is derived for at least one of each picture, slice, tile, tile group and CTU group.

In one example, the at least one LIC parameter table is inherited from those of at least one of a picture, slice, tile, tile group and CTU group which is previously converted.

In one example, the at least one LIC table is signaled for specific reference pictures or all of reference pictures.

In one example, the specific reference pictures comprise first reference picture of each prediction direction.

In one example, the at least partial of the set of LIC parameters is quantized before being signaled and a quantization step is signaled in at least one of a picture parameter set (PPS), a sequence parameter set (SPS), a video parameter set (VPS), a slice header, a tile group header and a tile header.

In one example, the at least partial of set of LIC parameters is left shifted by K before being quantized, and K is predefined or signaled.

In one example, the at least partial of the set of LIC parameters comprises only one of a scaling factor and an offset factor, and the other of the scaling factor and the offset factor is predefined as a default value.

In one example, the at least partial of the set of LIC parameters comprises only one of a scaling factor and an offset factor, and the other of the scaling factor and the offset factor is derived using neighboring samples of the video block and corresponding reference samples.

In one example, the at least partial of the set of LIC parameters comprises both a scaling factor and an offset factor.

In one example, the scaling factor and the offset factor are left-shifted with different values and/or the scaling factor and the offset factor are quantized with different quantization steps.

In one example aspect, a method of processing video is disclosed. The method includes storing, for a video block, local illumination compensation (LIC) information together with motion information, as an entry, in a history based motion vector prediction (HMVP) table, wherein the LIC information is associated with the motion information; and performing a conversion on the video block based on the HMVP table.

In one example, the LIC information comprises at least one of LIC flag indicating whether the LIC is applied to the video block and a set of LIC parameters associated with the LIC of the video block.

In one example, the LIC information is not considered when a pruning process is performed on at least one table or list which uses the associated motion information.

In one example, the at least one table or list comprises any one of a merge candidate list, a history based motion vector prediction (HMVP) table and an advanced motion vector prediction (AMVP) list.

In one example, for a video block converted with the LIC, the associated motion information is not used to update the HMVP table.

In one example, the conversion includes encoding the current block into the bitstream representation of the video and decoding the current block from the bitstream representation of the video.

In one example aspect, an apparatus in a video system is disclosed. The apparatus comprises a processor and a non-transitory memory with instructions thereon, wherein the instructions upon execution by the processor, cause the processor to implement any one of methods described above.

In one example aspect, there is disclosed a computer program product stored on a non-transitory computer readable media, the computer program product including program code for carrying out any one of methods described above.

It will be appreciated that the disclosed techniques may be embodied in video encoders or decoders to improve compression efficiency.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of processing video data, comprising:

determining, for a first video block, a set of local illumination compensation (LIC) parameters including a scaling factor and an offset factor; and updating at least one history based local illumination compensation parameter table (HLICT) using at least one parameter of the set of LIC parameters, wherein the at least one HLICT is used for a conversion of subsequent video blocks of the first video block, and wherein the at least one parameter of the set of LIC parameters is quantized before being signaled and a quantization step is signaled in at least one of a picture parameter set (PPS), a sequence parameter set (SPS), a video parameter set (VPS), a slice header, a tile group header and a tile header.

2. The method of claim 1, wherein the set of LIC parameters is derived from neighboring samples associated with the first video block, and wherein the neighboring samples associated with the first video block are neighboring reconstructed samples or neighboring predicted samples generated from one or more reference pictures.

3. The method of claim 1, further comprising:

determining whether a pre-processing operation on the at least one parameter of the set of LIC parameters is skipped, wherein the pre-processing operation comprises:

quantizing the at least one parameter of the set of LIC parameters, and the quantizing is performed as follows:

$$SatShift(x, n) = \begin{cases} (x + \text{offset0}) \gg n & \text{if } x \geq 0 \\ -((-x + \text{offset1})) \gg n & \text{if } x < 0 \end{cases}$$

wherein Shift(x, n) is defined as Shift(x, n)=(x+offset0)>>n, x representing a value of the at least one parameter of the set of LIC parameters to be quantized, and wherein at least one of offset0 and offset1 is set to (1<<n)>>1 or (1<<(n−1)), or at least one of offset0 and offset1 is set to 0, n=2, wherein the pre-process further comprises:

clipping the at least one parameter of the set of LIC parameters, and the clipping is performed as follows:

$$\text{Clip3}(\text{Min}, \text{Max}, x) = \begin{cases} \text{Min} & \text{if } x < \text{Min} \\ \text{Max} & \text{if } x > \text{Max} \\ x & \text{Otherwise} \end{cases}$$

wherein x represents a value of the at least one parameter of the set of LIC parameters to be clipped, Min=−128, and Max=127, and wherein the at least one parameter of the set of LIC parameters is quantized before being clipped.

4. The method of claim 1, wherein the updating is performed in a first-in first-out (FIFO) order, wherein the updating includes determining whether a number of entries of the HLICT reaches a threshold, and removing a first entry from the HLICT and the number of available entries in the HLICT is decreased by 1 when the number of entries reaches the threshold, or wherein the updating comprises inserting at least one parameter of the set of LIC parameters into the HLICT as a last entry, and the number of available entries in the HLICT is increased by 1 after the inserting.

5. The method of claim 4, further comprising:

preforming a pruning process to determine whether to insert the at least one parameter of the set of LIC parameters into the HLICT, wherein the pruning process comprises:

comparing the at least one parameter of the set of LIC parameters with each of all existing entries in the HLICT; and determining that no insertion is performed when they are same or similar, wherein the method further comprises:

comparing a value of a reference picture index or reference picture picture-order-count (POC) associate with the at least one parameter of the set of LIC parameters with that associated with each of all existing entries, wherein when any of existing entries in the HLICT is identical to the at least one parameter of the set of LIC parameters, all entries after the identical entry are moved forward and the identical entry is moved afterward as a last entry in the HLICT, wherein the at least one parameter of the set of LIC parameters comprises both the scaling factor and the offset factor, or comprises only one of the scaling factor and the offset factor, and wherein when the at least one parameter of the set of LIC parameters comprises only one of the scaling factor and the offset factor, the other of the scaling factor and the offset factor is derived or set as a default value, or wherein the at least one parameter of the set of LIC parameters is the scaling factor.

6. The method of claim 1, further comprising:

maintaining, for a second video block, the at least one HLICT which includes one or more sets of LIC parameters;

determining, based on at least one indication, at least one set of LIC parameters from the at least one HLICT; and performing, illumination compensation process for the second video block, based on the at least one set of LIC parameters, wherein the second video block is coded with an advanced motion vector prediction (AMVP) mode, and wherein the at least one HLICT comprises one or more default HLICTs which are defined for specific reference pictures or all of reference pictures, or for specific reference picture pairs or all of reference picture pairs for the second video block.

7. The method of claim 6, wherein the at least one HLICT includes a plurality of HLICTs, and a number of HLICTs or a maximum length of each of the plurality of HLICTs is pre-defined or signaled in at least one of a picture parameter set (PPS), a sequence parameter set (SPS), a video parameter set (VPS), a sequence header, a slice header, a picture header, a tile group header, or other kinds of video units, wherein the number of HLICTs depends on a number of reference pictures or a number of reference picture lists of the second video block, or the number of HLICTs depends on allowed coding modes of the second video block, wherein the allowed coding modes of the second video block comprise at least one of an affine mode and a non-affine mode, wherein one HLICT is maintained for each of one or more reference pictures, or the at least one HLICT is maintained for specific reference pictures or all of reference pictures, or the at least one HLICT is maintained for specific reference picture pairs or all of reference picture pairs, wherein the specific reference pictures comprise a first reference picture of each prediction direction, wherein each of all reference picture pairs comprises a reference picture from reference picture list 0 and a reference picture from reference picture list 1, and the specific reference picture pairs comprises only one reference pair including a first reference picture from reference picture list 0 and a first reference picture from reference picture list 1, and wherein the second video block is coded in merge mode or ultimate motion vector expression (UMVE) mode.

8. The method of claim 6, wherein the at least one indication comprising a first indication indicating that which set of LIC parameters is used for each of the reference pictures, wherein when the second video block is converted with a bi-prediction, the first indication indicating that which set of LIC parameters of the reference picture pairs is used for two reference pictures of the second video block, or when the second video block is converted with a bi-prediction and when there is no HLICT available for its reference picture pair, LIC is disabled for the second video block implicitly, wherein a LIC flag is constrained to be false, and no LIC flag is signaled and the LIC flag is implicitly derived to be false, or a LIC flag is inherited from merge candidates of the second video block to indicate whether LIC is applied to the second video block, wherein the set of LIC parameter is inherited from merge candidates of the second video block, and the merge candidates only comprise spatial merge candidates, and wherein the at least one indication further comprises a LIC parameter index to indicate which set of LIC parameters is used when the inherited LIC flag indicates the LIC is applied to the second video block.

9. The method of claim 1, wherein the set of LIC parameters is associated with the first video block located at a first position, and the method further comprises: processing at least one second video block located at a second position based on the HLICT, and wherein the first position is a boundary of coding tree unit (CTU), or the first position is a boundary of a row of CTU.

10. The method of claim 1, wherein the set of LIC parameters is derived from neighboring samples of the first video block and corresponding reference samples, wherein the neighboring samples of the first video block comprises at least one of:

above neighboring samples;

left neighboring samples;

above and left neighboring samples;

above-right neighboring samples;

below-left neighboring samples;
left and below-left neighboring samples;
above and above-right neighboring samples.

11. The method of claim 10, further comprising:
sub-sampling the neighboring samples by a factor N and deriving the set of LIC parameters from the sub-sampled neighboring samples, N>=1,
wherein the neighboring samples have at least one of sets of coordinates as follows:

$$\{(x-1, y), (y-1, x), (x-1, y+H-1), (x+W-1, y-1)\};$$

$$\{(x-1, y), (y-1, x), (x-1, y+H), (x+W, y-1)\};$$

$$\{(x-1, y), (y-1, x), (x-1, y+H/2-1), (x+W/2-1, y-1)\}; \text{ or}$$

$$\{(x-1, y), (y-1, x), (x-1, y+2*H-1), (x+2*W-1, y-1)\},$$

x, y representing coordinates of a top-left corner of the first video block, and W, H representing a width and height of the first video block respectively, or
wherein the neighboring samples comprise:
neighboring samples located in at least one of above and above-left CTUs;
neighboring samples located in at least one of above and above-right CTUs;
neighboring samples located in at least one of left and above-left CTUs; or
neighboring samples located in left and above CTUs,
wherein the corresponding reference samples are identified by using motion information associated with the first video block, wherein the motion information is modified before being used to identify the corresponding reference samples and the motion information comprises motion vectors, wherein modifying the motion information comprises rounding the motion vectors to integer precisions, and
wherein the neighboring samples and the first video block belong to a same tile or a same tile group, and the first video block comprises at least one of a current block, a current prediction unit, a current CTU, a current virtual pipelining data unit (VPDU).

12. The method of claim 1, wherein the set of LIC parameters are derived from samples associated with the first video block.

13. The method of claim 12, wherein the samples comprise neighboring/non-adjacent bi-predicted reconstructed samples of at least one subsequent video block and the corresponding prediction samples, wherein at least one of the neighboring/non-adjacent bi-predicted reconstructed samples of the at least one subsequent video block and the corresponding prediction samples are split into a plurality of sets of samples, and the LIC parameters are derived from each set of samples, wherein same motion information is shared within each set of samples, wherein the first video block is located at a right or bottom boundary of a CTU, wherein the subsequent video blocks comprise at least one of subsequent CTU or a VPDU; or
wherein the samples associated with the first video block comprise only partial samples within the first video block, wherein the partial samples are one of: samples located in every Nth row and/or column; or samples located at four corners of the first video block; or the partial samples exclude samples cross VPDU boundary.

14. The method of claim 12, wherein a characteristic of the first video block meets a specific condition, wherein the characteristic of the first video block comprises at least one of a code mode, motion information, a size, a width and a height of the first video block, wherein the size of the first video block is equal to the width of the first video block multiplied by the height of the first video block,
wherein the code mode of the first video block does not belong to any of the following:
an affine mode, a weighted prediction, a generalized bi-prediction (GBI) or a combined inter and intra prediction (CIIP),
wherein the first video block is a LIC-coded block, the size of the first video block is larger than a first threshold or smaller than a second threshold, or at least one of the width and height of the first video block is larger than a third threshold or smaller than a fourth threshold, wherein the HLICT and the at least one parameter of the set of LIC parameters are signaled in at least one of the PPS, the SPS, the VPS, the slice header, the tile group header and the tile header, wherein the HLICT is derived for at least one of each picture, slice, tile, tile group and CTU group and is inherited from those of at least one of a picture, slice, tile, tile group and CTU group which is previously converted,
wherein the HLICT is signaled for specific reference pictures or all of reference pictures, wherein the specific reference pictures comprise first reference picture of each prediction direction.

15. The method of claim 12, wherein the at least one parameter of the set of LIC parameters is left shifted by K before being quantized, and K is predefined or signaled,
wherein the at least one parameter of the set of LIC parameters comprises only one of the scaling factor and the offset factor, and the other of the scaling factor and the offset factor is predefined as a default value, or
wherein the at least one parameter of the set of LIC parameters comprises only one of the scaling factor and the offset factor, and the other of the scaling factor and the offset factor is derived using neighboring samples of the first video block and corresponding reference samples, or
wherein the at least one parameter of the set of LIC parameters comprises both a scaling factor and an offset factor, wherein the scaling factor and the offset factor are left-shifted with different values and/or the scaling factor and the offset factor are quantized with different quantization steps.

16. The method of claim 1, further comprises:
storing, for the first video block, LIC information together with motion information, as an entry, in a history-based motion vector prediction (HMVP) table, wherein the LIC information is associated with the motion information; and
performing a conversion on the first video block based on the HMVP table,
wherein the LIC information comprises at least one of LIC flag indicating whether the LIC is applied to the first video block and a set of LIC parameters associated with the LIC of the first video block, wherein the LIC information is not considered when a pruning process is performed on at least one table or list which uses the associated motion information, wherein the at least one table or list comprises any one of a merge candidate list, a history based motion vector prediction (HMVP) table and an advanced motion vector prediction (AMVP) list, and wherein for a video block converted with the LIC, the associated motion information is not used to update the HMVP table.

17. The method of claim 1, wherein the conversion includes encoding the subsequent video blocks into a bitstream.

18. The method of claim 1, wherein the conversion includes decoding the subsequent video blocks from a bitstream.

19. An apparatus for processing video data comprising a processor and a non-transitory memory with instructions thereon, wherein the instructions upon execution by the processor, cause the processor to:

determine, for a first video block, a set of local illumination compensation (LIC) parameters including a scaling factor and an offset factor; and update at least one history based local illumination compensation parameter table (HLICT) using at least one parameter of the set of LIC parameters, wherein the at least one HLICT is used for a conversion of subsequent video blocks of the first video block, and wherein the at least one parameter of the set of LIC parameters is quantized before being signaled and a quantization step is signaled in at least one of a picture parameter set (PPS), a sequence parameter set (SPS), a video parameter set (VPS), a slice header, a tile group header and a tile header.

20. A non-transitory computer-readable recording medium storing a bitstream of a video which is generated by a method performed by a video processing apparatus, wherein the method comprises:

determining, for a first video block, a set of local illumination compensation (LIC) parameters including a scaling factor and an offset factor;

updating at least one history based local illumination compensation parameter table (HLICT) using at least one parameter of the set of LIC parameters, wherein the at least one HLICT is used for a conversion of subsequent video blocks of the first video block; and generating the bitstream based on the at least one HLICT, and wherein the at least one parameter of the set of LIC parameters is quantized before being signaled and a quantization step is signaled in at least one of a picture parameter set (PPS), a sequence parameter set (SPS), a video parameter set (VPS), a slice header, a tile group header and a tile header.

* * * * *